(12) United States Patent
Bishop

(10) Patent No.: US 12,466,549 B2
(45) Date of Patent: Nov. 11, 2025

(54) AIRCRAFT LANDING GEAR ASSEMBLY

(71) Applicant: AIRBUS OPERATIONS LIMITED, Bristol (GB)

(72) Inventor: Benjamin Bishop, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 122 days.

(21) Appl. No.: 18/320,443

(22) Filed: May 19, 2023

(65) Prior Publication Data

US 2023/0373615 A1 Nov. 23, 2023

(30) Foreign Application Priority Data

May 20, 2022 (GB) ...................................... 2207424

(51) Int. Cl.
*B64C 25/12* (2006.01)
(52) U.S. Cl.
CPC ..................... *B64C 25/12* (2013.01)
(58) Field of Classification Search
CPC ...................................................... B64C 25/30
See application file for complete search history.

(56) References Cited

U.S. PATENT DOCUMENTS

| 4,155,522 A | 5/1979 | Sealey |
| 4,537,374 A * | 8/1985 | Barnoin ................. F16F 7/125 188/371 |
| 8,439,304 B2 | 5/2013 | Mairou et al. |

FOREIGN PATENT DOCUMENTS

| EP | 0 115 435 A2 | 8/1984 |
| EP | 0 676 328 A2 | 10/1995 |
| EP | 1 279 591 A1 | 1/2003 |
| EP | 3 862 263 A1 | 8/2021 |
| FR | 2 739 351 A1 | 4/1997 |
| GB | 2 094 242 A | 9/1982 |
| KR | 10-20110067289 A | 6/2011 |
| KR | 10-20120044602 A | 5/2012 |
| KR | 10-1850217 B1 | 4/2018 |

OTHER PUBLICATIONS

Combined Search and Examination Report for Application No. GB 2207424.9, seven pages, dated May 25, 2023.
Combined Search and Examination Report for Application No. GB2207424.9 dated Nov. 17, 2022, 6 pages.
Extended European Search Report for Application No. 23174068.9, seven pages, dated Sep. 19, 2023.

* cited by examiner

*Primary Examiner* — Christopher D Hutchens
*Assistant Examiner* — Nevena Aleksic
(74) *Attorney, Agent, or Firm* — Nixon & Vanderhye P.C.

(57) ABSTRACT

An aircraft landing gear assembly is disclosed including a leg assembly having a trailing arm configured to rotate about an axis and carry a wheel, a shock absorber coupled to the arm and enabled to dampen rotation of the arm about the axis within a normal operating range, and to limit the rotation of the arm about the first trailing arm axis to the normal operating range, and a fuse member coupled to the shock absorber. The fuse member is configured to fail in the event a vertical load on the wheel exceeds a pre-determined threshold, wherein failure of the fuse member allows the first trailing arm to rotate about the first trailing arm axis beyond the normal operating range.

16 Claims, 9 Drawing Sheets

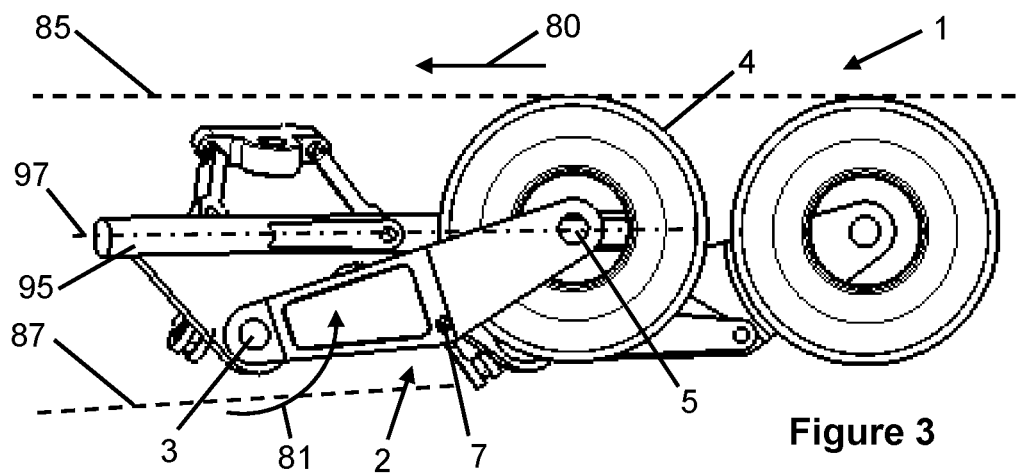
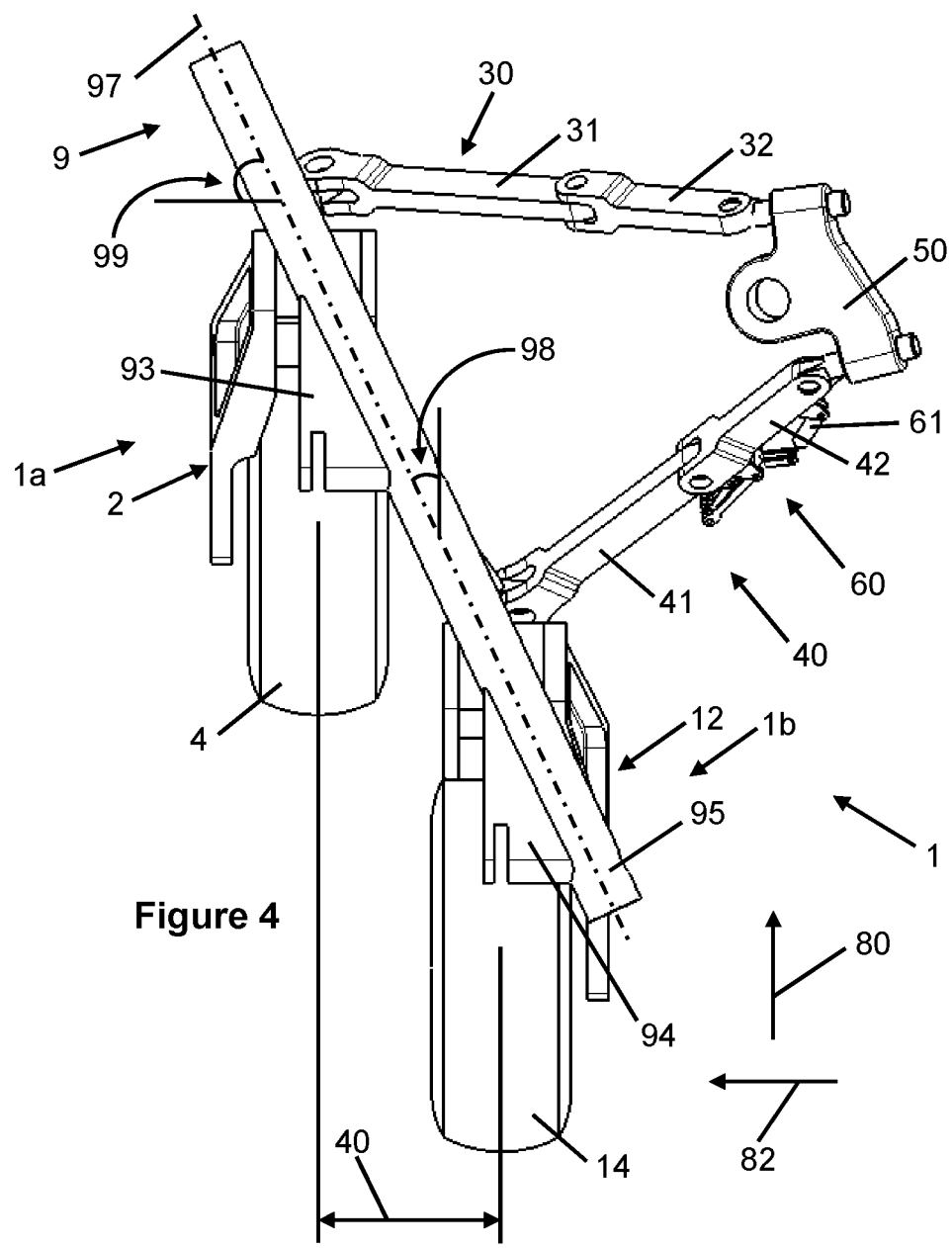

AIRCRAFT LANDING GEAR ASSEMBLY

CROSS RELATED APPLICATION

This application claims priority to United Kingdom Patent Application GB 2207424.9 filed May 20, 2022, the entire contents of which is hereby incorporated by reference.

BACKGROUND OF THE INVENTION

The present disclosure relates to aircraft landing gear assemblies. More particularly, but not exclusively, this invention concerns a first type of aircraft landing gear assembly comprising a fuse pin to decouple a shock absorber and trailing arm such that the trailing arm can rotate beyond a normal operating range. Further, this invention concerns a second type of aircraft landing gear assembly comprising a common pintle to rotate and thus move a first leg assembly and a second leg assembly between an extended configuration and a retracted configuration of the assembly. The invention also concerns aircraft comprising the first type or second type of aircraft landing gear assembly, and methods of operating aircraft landing gear assemblies.

An aircraft landing gear assembly supports the aircraft when landing by contacting the ground first and absorbing ground impact to reduce loads transmitted to the body of the aircraft. Typically, the landing gear comprises a wheel that deflects within the limits of a shock absorber that dampens loads applied to the wheel. Regulators require that landing gear are designed such that, in the event the landing gear experiences vertical loads in excess of the design threshold, the landing gear fails safely so the landing gear cannot damage the cabin or any fuel tanks located above the landing gear.

In order to ensure safe collapse of the landing gear in extreme landing conditions aviation regulations require that the intrusion of the landing gear into the cabin and/or fuel tank is prohibited. In large commercial aircraft, such as the A380, the volume of the aircraft allows for lots of space between the landing gear and the cabin or fuel tanks making it possible to integrate the landing gear in such aircraft because the landing gear can fail into that additional space. However, it is more difficult to incorporate the landing gear into smaller commercial aircraft and/or unconventional aircraft where there may be limited space between the landing gear and the cabin or fuel tanks, for example, when the fuselage (belly) has a flatter cross-section. It would be advantageous to provide a landing gear that can be incorporated into such aircraft.

In general, integration of the landing gear into an aircraft is difficult because space is limited. Accordingly, it is advantageous to provide a landing gear that is more compact when stowed. Alternatively or additionally, the provision of alternative landing gear arrangements provides aircraft designers with further options when looking to integrate the landing gear into an aircraft.

The present invention seeks to mitigate the above-mentioned problems. Alternatively or additionally, the present invention seeks to provide an improved aircraft landing gear assembly and/or improved method of operating an aircraft landing gear assembly.

SUMMARY OF THE INVENTION

The present invention provides according to a first aspect, an aircraft landing gear assembly. The aircraft landing gear assembly may comprise a first leg assembly. The first leg assembly may comprise a first trailing arm configured to carry a first wheel. The first trailing arm may be configured to rotate about a first trailing arm axis when the aircraft landing gear assembly is in an extended configuration. The first leg assembly may comprise a first shock absorber. The first shock absorber may be configured to dampen rotation of the first trailing arm about the first trailing arm axis within a normal operating range, for example, when a vertical load is applied to the first wheel. The first shock absorber may be configured to limit the rotation of the first trailing arm about the first trailing arm axis to the normal operating range, for example, when the vertical load is applied to the first wheel. The first leg assembly may comprise a first fuse member coupled to the first shock absorber. The first fuse member may be configured to fail in the event a vertical load on the first wheel exceeds a pre-determined threshold. Failure of the first fuse member may allow the first trailing arm to rotate about the first trailing arm axis beyond the normal operating range. Beneficially, the aircraft landing gear assembly may be configured to fail in a pre-determined order. The first fuse member is configured to fail to allow the first leg assembly to collapse by freeing rotation of the first trailing arm in an abnormal impact scenario.

Aircraft landing gear assemblies in accordance with the present invention, may enable disablement of the respective shock absorber responsive to an excessive vertical load experienced on the landing gear assembly. Such assemblies may be suitable for installation adjacent confined locations of an aircraft into which the landing gear assembly can safely be received. Additionally or alternatively, the provision of such a fuse member may allow the landing gear to fail into a more compact collapse state, wherein the collapsed state is different to a retracted state of the landing gear assembly. This facilitates integration of the landing gear with small and/or unconventional aircraft (such as blended wing aircraft) in which space is limited.

According to a second aspect, an aircraft landing gear assembly is provided. The aircraft landing gear assembly may comprise a common pintle. The common pintle may be configured to mount the aircraft landing gear assembly to an aircraft. The common pintle may be rotatable to and away from an extended configuration of the aircraft landing gear assembly. The common pintle may be rotatable between the extended configuration and a retracted configuration of the aircraft landing gear assembly. The aircraft landing gear assembly may comprise a first leg assembly. The first leg assembly may comprise a first trailing arm configured to carry a first wheel. The first leg assembly may carry the first wheel. The first trailing arm may be configured to rotate about a first trailing arm axis when the aircraft landing gear assembly is in the extended configuration. The first leg assembly may comprise a first shock absorber. The first shock absorber may be coupled to the first trailing arm. The first shock absorber may be configured to dampen rotation of the first trailing arm about the first trailing arm axis. The aircraft landing gear assembly may comprise a second leg assembly. The second leg assembly may comprise a second trailing arm configured to carry a second wheel. The second leg assembly may carry the second wheel. The second trailing arm may be configured to rotate about a second trailing arm axis when the aircraft landing gear assembly is in the extended configuration. The second leg assembly may comprise a second shock absorber. The second shock absorber may be coupled to the second trailing arm. The second shock absorber may be configured to dampen rotation of the second trailing arm about the second trailing arm axis. The aircraft landing gear assembly may be arranged such that rotation of the common pintle is configured to move the first leg assembly and the second leg assembly between the extended configuration and the retracted configuration.

Aircraft landing gear assemblies in accordance with the present invention, may enable the landing gear to operate in a space-efficient manner by positioning the leg assemblies side-by-side when in an extended position. Such assemblies may be suitable for installation in aircraft with confined internal spaces (for example, landing gear bays and/or beneath a cabin floor) into which the landing gear assembly is received. Such aircraft include those with a low profile such as blended wing aircraft. This may avoid the landing gear compromising an aerodynamic performance of the aircraft. Such landing gear assemblies may be operable with fewer components than traditional assemblies, which can help to save weight.

Optional features of the first aspect and/or the second aspect and/or any other aspect are discussed below. Optional features may be combined. Optional features may be applied to any number of the aspects described herein.

The first trailing arm may be a lever to rotate about the first trailing arm axis. The first trailing arm may rotate about the first trailing arm axis in response to contact with the ground and in response to surface changes of the ground when the assembly is in the extended configuration and the first trailing arm is in the normal operating range. A lengthwise direction of the first trailing arm may be offset from the vertical when the assembly is in the extended configuration and the first trailing arm is in the normal operating range. The lengthwise direction of the first trailing arm may be no less than 10, 15, 20, or 25 degrees to the vertical when the assembly is in the extended configuration and the first trailing arm is in the normal operating range. The lengthwise direction of the first trailing arm may be about 30 degrees to the vertical when the assembly is in the extended configuration and the first trailing arm is at a limit of the normal operating range. The lengthwise direction of the first trailing arm may correspond to a linear direction between the first trailing arm axis and a rotation axis of the wheel when carried by the first trailing arm.

The first leg assembly may be configured to offset the wheel from the first trailing arm axis in the lengthwise direction of the aircraft landing gear assembly when the assembly is in the extended configuration. The first leg assembly may be configured to put the first trailing arm axis fore of at least a part of the wheel in the lengthwise direction of the aircraft landing gear assembly when the assembly is in the extended configuration.

The first fuse member may be elongate. The first fuse member may have a longitudinal axis that is parallel to the first trailing arm axis. The longitudinal axis of the first fuse member may be parallel to a first wheel axis, the first wheel axis being a rotation axis of the first wheel. The first fuse member may be located fore of the first wheel and/or the first wheel axis, for example, when the landing gear assembly is fully extended. The first fuse member may be arranged to couple the first trailing arm and the first shock absorber to release the first shock absorber from the first trailing arm when the pre-determined threshold is exceeded.

Properties of the first fuse member may differ to properties of other structural components of the first leg assembly, such as the first trailing arm, the first shock absorber, and fixing members to couple the various components of the first leg assembly together. The properties may include physical properties, such as a shear strength. The first fuse member may be configured with a lower shear strength compared to a shear strength of another fixing member of the first leg assembly, such as an axle about which the first trailing arm or the first shock absorber rotate. The differing properties of the first fuse member allow the first fuse member to be the first component to fail on a load path comprising the first trailing arm and the first shock absorber. The first fuse member may be configured as a deliberate point of weakness along the load path of the first leg assembly such that the first fuse member fails at a lower load than other components on the load path. Failure of the first fuse member alters the load path through the first leg assembly in order to mitigate against cabin floor and/or fuel tank intrusion of the landing gear. Although the first fuse member may be a point of relative weakness, it is designed to cope with operational loads experienced in routine landing and taxiing conditions such that the structure of the first fuse member is maintained unless extreme conditions are experienced. The load path may be defined as the path the vertical load travels through the first leg assembly when received by the wheel. The first fuse member may be configured to fail by breaking. The first fuse member may be or may comprise a pin. The first fuse member may be a fuse pin. The first fuse member may be configured to fail by shearing. The first fuse member may be a fuse pin. The fuse pin may be a shear pin configured to fail by a shear force exerted on the shear pin that exceeds a pre-determined threshold shear force. The fuse pin may comprise a narrow portion that is narrower that a main body of the fuse pin, wherein the narrow portion is configured to snap when load above a pre-determined threshold is applied to the fuse pin.

The first shock absorber may be configured to be in a maximum compressed state when the first trailing arm is at a limit of the normal operating range. The first shock absorber may be configured to limit the rotation of the first trailing arm about the first trailing arm axis to the normal operating range up to the maximum compressed state of the first shock absorber. The first shock absorber may be configured to extend away from the first trailing arm when the first trailing arm is to rotate about the first trailing arm axis within the normal operating range. The first shock absorber may be configured to rotate about an axis within the normal operating range. The first shock absorber may be configured to rotate about an axis within the normal operating range.

The first shock absorber according to the first aspect may be free to rotate in response to failure of the first fuse member. The first shock absorber may be configured to freely rotate about the axis beyond the normal operating range and in response to failure of the first fuse member.

Each first and second shock absorber may be coupled to a respective first and second trailing arm at a location part way along the respective first and second trailing arm. Each first and second shock absorber may be coupled at a midpoint of the respective first and second trailing arm and/or at an abrupt change of direction of the structure of the respective first and second trailing arm. A width of each first and second shock absorber may be no greater than a width of each respective first and second wheel. A spanwise space of each first and second shock absorber may be within a spanwise space of each respective first and second wheel when the aircraft landing gear assembly is in the extended configuration. Beneficially, the aircraft landing gear assembly can be compact when retracted.

The first trailing arm according to first aspect may be coupled to the first shock absorber by the first fuse member such that the failure of the first fuse member may cause the first shock absorber and the first trailing arm to become decoupled. On failure, a portion of the first fuse member may remain coupled to the first shock absorber and/or the first trailing arm.

The first fuse member according to the first aspect may be located part way along the first trailing arm. The first fuse member may be located between the first trailing arm axis and a first wheel axis, the first wheel axis being a rotation axis of the first wheel. The first fuse member may be located midway along a length of the first trailing arm.

The first shock absorber may be configured to rotate about a rotation axis when the vertical load is applied to the first wheel. The rotation axis of the first shock absorber may be vertically higher than the first trailing arm axis when the first wheel is in contact with the ground.

The first leg assembly may comprise the first wheel. The first trailing arm may be configured to carry a single wheel only, the single wheel being the only wheel of the aircraft landing gear assembly to make contact with the ground on landing and taxiing.

The first trailing arm may comprise two or more link members. Each link member may support the first fuse member. The first shock absorber may be provided between at least two of the two or more link members. The first trailing arm may comprise a primary link member that extends from the first trailing arm axis to the first wheel. The first trailing arm may be configured to carry the first wheel. The first trailing arm may comprise a secondary link member that extends from the first trailing arm axis and terminates at the first fuse member.

The aircraft landing gear assembly according to the first aspect may be configured such that failure of the first fuse member allows the first trailing arm to freely rotate about the first trailing arm axis such that at least part of the first wheel mounted to the first trailing arm is located above the trailing arm axis. The aircraft landing gear assembly may be configured such that when the first wheel rotates about the first trailing arm axis beyond the normal operating range, a first wheel axis is located above the first trailing arm axis, the first wheel axis being a rotation axis of the first wheel.

The aircraft landing gear assembly according to the first aspect may comprise a common pintle configured to mount the aircraft landing gear assembly to an aircraft.

The common pintle may be rotatable between an extended and a retracted configuration of the aircraft landing gear assembly. The aircraft landing gear assembly may be arranged such that rotation of the common pintle is configured to move the first leg assembly and the second leg assembly between the extended configuration and the retracted configuration. The common pintle may comprise a longitudinal axis about which the common pintle is configured to rotate between the extended and retracted configurations. The longitudinal axis may be offset to a lengthwise direction of the aircraft landing gear assembly. The common pintle may be configured to rotate when the aircraft landing gear assembly moves towards and away from the extended configuration. The common pintle may comprise an elongate member via which the first and second leg assemblies can be mounted to an aircraft. Each first and second shock absorber may be configured to rotate about a respective first and second shock absorber axis. The first and second leg assemblies may be coupled to the common pintle, such that the first and second trailing arm axis and the first and second shock absorber axis are all parallel to each other. The common pintle may comprise a mounting portion to which one of the first and second leg assemblies are coupled, such that the first and second trailing arm axis and the first and second shock absorber axis are all parallel to each other. The mounting portions may be configured such that the first and second trailing arm axis and the first and second shock absorber axis each extend in an orthogonal direction to the lengthwise direction of the aircraft landing gear assembly when the aircraft landing gear assembly is in the extended configuration. The first and second leg assemblies may be coupled to the common pintle at a different position along the longitudinal axis of the common pintle.

The aircraft landing gear assembly according to the first aspect may comprise a second leg assembly. The second leg assembly may comprise a second trailing arm configured to carry a second wheel and to rotate about a second trailing arm axis when the aircraft landing gear assembly is in the extended configuration. The second leg assembly may comprise a second shock absorber. The second shock absorber may be configured to dampen rotation of the second trailing arm about the second trailing arm axis within a normal operating range, for example, when a vertical load is applied to the second wheel. The second shock absorber may be configured to limit the rotation of the second trailing arm about the second trailing arm axis to the normal operating range. The second leg assembly may comprise a second fuse member coupled to the second shock absorber. The second fuse member may be configured to fail in the event a vertical load on the second wheel exceeds a pre-determined threshold. Failure of the second fuse member may allow the second trailing arm to rotate about the second trailing arm axis beyond the normal operating range. Beneficially, the aircraft landing gear assembly may be configured to fail in a pre-determined order. The second fuse member is configured to fail to allow the second leg assembly to collapse by freeing rotation of the second trailing arm in an abnormal impact scenario.

The first and second leg assemblies according to the first and/or second aspect may be coupled to the common pintle. The first and second leg assemblies may be coupled to the common pintle at a different position along the longitudinal axis of the common pintle. The first and second trailing arms may be configured to independently rotate about the respective first and second trailing arm axes, for example, when the aircraft landing gear assembly is in the extended configuration.

Each first and second trailing arm may be configured to carry a single wheel only, each single wheel being the only wheels of the aircraft landing gear assembly to make contact with the ground on landing and taxiing.

Each first and second trailing arm may be coupled to the common pintle. Each first and second shock absorber may be coupled to the common pintle. Each first and second shock absorber may be coupled to the common pintle at a location aft of a location of a respective first and second trailing arm is coupled to the common pintle. Each first and second shock absorber may be coupled to a lower portion of the common pintle compared to a location of coupling of a respective first and second shock absorber when the aircraft landing gear assembly is in the extended configuration.

The aircraft landing gear assembly may comprise a sidestay coupled to the common pintle, for example, to a mounting portion of the common pintle. The sidestay may be configured to transfer landing gear loads away from the landing gear assembly. The sidestay may be configured to counteract lateral loads on the landing gear and maintain a position of the common pintle relative to the aircraft in the extended configuration. The sidestay may be configured to extend inboard from the common pintle towards the centreline of an aircraft. The aircraft landing gear assembly may comprise a pair of sidestays. The, or each, sidestay may be a folding sidestay. The, or each, sidestay may be configured such that the length of the sidestay changes as the landing gear assembly moves between the extended and retracted configurations. The aircraft landing gear assembly may comprise two foldable sidestays coupled to the common pintle, for example, to each one of two mounting portions of the common pintle. The one or more folding sidestays may be directly or indirectly mountable to the aircraft. The aircraft landing gear assembly may comprise a yoke configured to mount the two foldable sidestays to the aircraft. The aircraft landing gear assembly may comprise one or more folding sidestays having a first end coupled to the common pintle and a second end mountable to the aircraft. An actuator, for example, a linear actuator, may be operable to cause the one or more folding sidestays to unfold in the extended configuration and to fold in the retracted configuration. The aircraft landing gear assembly may comprise two foldable sidestays each coupled to the common pintle.

The aircraft landing gear assembly may be configured to move between an extended configuration (for example for use during landing and/or taxiing) and a retracted configuration (for example for use during airborne cruise). The common pintle may comprise a longitudinal axis. The first leg assembly may be configured to rotate about the longitudinal axis of the common pintle when retracting and extending. The first shock absorber and/or first trailing arm may extend from and rotate with respect to the common pintle.

The aircraft landing gear assembly may comprise an actuator mechanism operable to cause the first and second leg assemblies and the common pintle to rotate about the longitudinal axis of the common pintle and thereby move the aircraft landing gear assembly between the extended and retracted configurations. The actuator mechanism may comprise a linear actuator. The actuator mechanism may comprise a plurality of pivotal link members. One of the plurality of pivotal link members may pivot about an axis point part-way along said link member. The longitudinal axis may have an angle greater than 10 degrees to a lengthwise direction of the aircraft landing gear assembly. The angle of the longitudinal axis of the common pintle may be about 25 degrees to the lengthwise direction. The angle of the longitudinal axis of the common pintle with respect to the lengthwise direction may be when the aircraft landing gear assembly is in either or both of the extended configuration and retracted configuration. Beyond the normal operating range, the first wheel axis and/or the second wheel axis may become vertically aligned with the longitudinal axis of the common pintle.

The common pintle may be rotatable about a longitudinal axis to move the landing gear assembly between the extended and retracted configurations. The common pintle may be rotatable to locate the separate wheels with a spanwise offset from each other in the extended and/or retracted configurations, and/or a configuration of the aircraft landing gear assembly between the extended and/or retracted configurations.

The first and second leg assemblies may be spaced apart from each other in a spanwise direction of the aircraft landing gear assembly. When the aircraft landing gear assembly is arranged in the extended configuration and/or a retracted configuration, the first and second leg assemblies may be spaced apart from each other in the spanwise direction. When the aircraft landing gear assembly is in the extended and/or retracted configuration, the first and second leg assemblies may be spaced apart from each other in the lengthwise direction of the aircraft landing gear assembly.

The spanwise offset may be present when the aircraft landing gear assembly is in an intermediate configuration between the extended and retracted configurations.

The aircraft landing gear assembly may comprise only two wheels, one of the two wheels being the first wheel carried by the first trailing arm, and the other one of the two wheels being the second wheel carried by the second trailing arm.

Any feature of the second leg assembly may be configured according to the description above concerning the first leg assembly. For example, the second trailing arm, the second shock absorber and/or the second fuse member may comprise any feature referred to in relation to the first trailing arm, the first shock absorber and/or the first fuse member, respectively.

According to a third aspect of the invention, an aircraft comprising the aircraft landing gear assembly according to the first aspect, second aspect, or any other aspect is provided.

The aircraft may be a commercial passenger aircraft, for example an aircraft configurable to carry more than fifty passengers, for example more than one hundred passengers. It may be that the aircraft is a fixed wing aircraft. It may be that the aircraft is a blended wing aircraft. It may be that the aircraft landing gear assembly is a wing mounted landing gear (i.e. mounted wholly or partially to a wing of the aircraft), a fuselage mounted landing gear (i.e. mounted wholly or partially to the fuselage of the aircraft landing gear assembly) and/or a nose landing gear (e.g. a steerable aircraft landing gear assembly). It may be that the aircraft landing gear assembly is a retractable aircraft landing gear assembly.

The aircraft may comprise first and second aircraft landing gear assemblies of the first aspect of the present invention, the first aircraft landing gear assembly being located on the port side of the aircraft and the second aircraft landing gear assembly being located on the starboard side of the aircraft. Those skilled in the art will realise that certain larger aircraft may be provided with further landing gear assembly in addition to the first and second aircraft landing gear assemblies.

The aircraft landing gear assembly according to the first aspect or the second aspect, wherein when the assembly comprises a first leg assembly and a second leg assembly, the first and second leg assemblies may be arranged on the same spanwise side of a centreline of the aircraft.

According to a fourth aspect of the invention, a method of operating an aircraft landing gear assembly is provided. The aircraft landing gear assembly may comprise a first leg assembly. The first leg assembly may comprise a first trailing arm carrying a first wheel. The first leg assembly may comprise a first shock absorber. The first leg assembly may comprise a first fuse member coupled to the first shock absorber. It may be that, during normal operation when the aircraft landing gear assembly is in an extended configuration, the first trailing arm rotates about a first trailing arm axis in response to a vertical load applied to a the first wheel. It may be that rotation of the first trailing arm is damped by the first shock absorber within a normal operating range. It may be that rotation of the first trailing arm is limited by the first shock absorber to the normal operating range. It may be that, in the event that the vertical load acting on the first wheel exceeds a pre-determined threshold, the first fuse member fails such that the first trailing arm rotates beyond the normal operating range.

It may be that the first shock absorber is compressed to a maximum compressed state when the first trailing arm is at a limit of the normal operating range.

It may be that failure of the first fuse member causes the first shock absorber to become decoupled from the first trailing arm.

The aircraft landing gear assembly may comprise a second leg assembly. The second leg assembly may comprise a second trailing arm carrying a second wheel. The second leg assembly may comprise a second shock absorber. The second leg assembly may comprise a second fuse member coupled to the second shock absorber. The aircraft landing gear assembly may comprise a common pintle coupled to the first and second leg assemblies. The common pintle may be rotatably mounted to an aircraft. It may be that, during normal operation when the aircraft landing gear assembly is in an extended configuration, the second trailing arm rotates about a second trailing arm axis in response to a vertical load applied to a the second wheel. It may be that rotation of the second trailing arm is damped by the second shock absorber within a normal operating range. It may be that rotation of the second trailing arm is limited by the second shock absorber to the normal operating range. It may be that, the rotation of the second trailing arm about the second trailing arm axis is independent of the rotation of the first trailing arm about the first trailing arm axis. It may be that, in the event that the vertical load acting on the second wheel exceeds a pre-determined threshold, the second fuse member fails such that the second trailing arm rotates beyond the normal operating range independently of the rotation of the first trailing arm about the first trailing arm axis.

It may be that the method comprises moving the first leg assembly and the second leg assembly from a retracted configuration to the extended configuration by rotating the first leg assembly and the second leg assembly about a longitudinal axis of the common pintle.

It may be that in the extended configuration, the first and second wheels are spaced apart from each other in a spanwise direction and/or lengthwise direction of the aircraft landing gear assembly.

According to a fifth aspect of the invention, a method of operating an aircraft landing gear assembly is provided. The aircraft landing gear assembly may comprise a first leg assembly. The first leg assembly may comprise a first trailing arm carrying a first wheel. The first leg assembly may comprise a first shock absorber. The first shock absorber may be coupled to the first trailing arm. The aircraft landing gear assembly may comprise a second leg assembly. The second leg assembly may comprise a second trailing arm carrying a second wheel. The second leg assembly may comprise a second shock absorber. The second shock absorber may be coupled to the second trailing arm. The aircraft landing gear assembly may comprise a common pintle. The common pintle may be coupled to the first and second leg assemblies. The common pintle may be rotatably mounted to an aircraft. It may be that, rotation of the common pintle causes the aircraft landing gear assembly to move from a retracted configuration to an extended configuration, such that when the aircraft landing gear assembly is in the extended configuration by rotating the common pintle from a retracted configuration to the extended configuration, the first and second trailing arms each rotate about a respective first and second trailing arm axis in response to a vertical load applied to the respective first and second wheel. The rotation of each first and second trailing arm may be damped by the respective first and second shock absorber within a normal operating range.

It may be that the method comprises moving the first and second leg assemblies from a retracted configuration to the extended configuration by rotating the first and second leg assemblies about a longitudinal axis of the common pintle.

It may be that in the extended configuration, the first wheel of the first leg assembly is spaced apart from the second wheel of the second leg assembly in a spanwise direction and/or lengthwise direction of the aircraft landing gear assembly.

According to a sixth aspect, an aircraft landing gear assembly is provided. The aircraft landing gear assembly may comprise a common pintle. The common pintle may be configured to mount the aircraft landing gear assembly to an aircraft. The common pintle may be rotatable between an extended and a retracted configuration of the aircraft landing gear assembly. The common pintle may be configured to rotate when the aircraft landing gear assembly moves towards and away from the extended configuration. The common pintle may comprise an elongate member via which the first and second leg assemblies can be mounted to an aircraft. The aircraft landing gear assembly may comprise a first and second leg assembly. The first and second leg assembly may be coupled to the common pintle. The first and second leg assembly may be spaced apart with a spanwise offset. Each of the first and second leg assemblies may comprise a trailing arm, a shock absorber, and/or a fuse member. Each trailing arm may be configured to carry a wheel. Each trailing arm may be configured to rotate about a respective trailing arm axis when the aircraft landing gear assembly is in the extended configuration. Each shock absorber may be coupled to each respective trailing arm. Each shock absorber may be configured to dampen rotation of each respective trailing arm about each respective trailing arm axis within a normal operating range. Each shock absorber may be configured to limit the rotation of the respective trailing arm about the respective trailing arm axis to the normal operating range. The respective fuse pin may be coupled to the respective shock absorber. The respective fuse pin may be configured to break, for example, when a load acting on the respective fuse pin exceeds a pre-determined threshold. Failure of the respective fuse pin, for example, by the respective fuse pin breaking in such a way, may be configured to remove the limit imposed on the respective trailing arm by the respective shock absorber. The aircraft landing gear assembly may arranged such that rotation of the common pintle is configured to move the first leg assembly and the second leg assembly between the extended configuration and the retracted configuration.

According to a seventh aspect of the invention, an aircraft landing gear assembly is provided. The aircraft landing gear assembly may comprise a common pintle. The common pintle may be configured to mount the aircraft landing gear assembly to an aircraft. The common pintle may be rotatable between an extended and a retracted configuration of the aircraft landing gear assembly. The common pintle may be configured to rotate when the aircraft landing gear assembly moves towards and away from an extended configuration. The aircraft landing gear assembly may comprise a first and second leg assembly. The first and second leg assembly may be coupled to the common pintle. The first and second leg assembly may be spaced apart with a spanwise offset. Each of the first and second leg assemblies may comprise a trailing arm, and/or a shock absorber. Each trailing arm may be configured to carry a wheel. Each trailing arm may be configured to rotate about a respective trailing arm axis when the aircraft landing gear assembly is in the extended configuration. Each shock absorber may be coupled to a respective trailing arm. Each shock absorber may be configured to dampen rotation of each respective trailing arm about the respective trailing arm axis, preferably within a normal operating range. Each shock absorber may be configured to limit the rotation of the respective trailing arm about the respective trailing arm axis to the normal operating range. The aircraft landing gear assembly may arranged such that rotation of the common pintle is configured to move the first leg assembly and the second leg assembly between the extended configuration and the retracted configuration.

The common pintle may have a longitudinal axis about which the common pintle is configured to rotate to move the aircraft landing gear assembly between the extended and retracted configurations. The longitudinal axis may be offset to a lengthwise direction of the aircraft landing gear assembly. The first and second leg assemblies maybe coupled to the common pintle at a different position along the longitudinal axis of the common pintle.

The first leg assembly may be coupled aft of the second leg assembly along the lengthwise direction of the landing gear assembly. The first trailing arm may be coupled to the common pintle aft of the second trailing arm is coupled to the common pintle. The first shock absorber may be coupled to the common pintle aft of the second shock absorber is coupled to the common pintle. When the aircraft landing gear assembly is in the extended configuration, the first leg assembly may be outboard and forward of the second leg assembly. When the aircraft landing gear assembly is in a retracted configuration, the first leg assembly may be outboard and forward of the second leg assembly.

It will of course be appreciated that features described in relation to one aspect of the present invention may be incorporated into other aspects of the present invention. For example, the aircraft landing gear assembly of the second and/or seventh aspect may comprise the first fuse member and/or the second fuse member of the first aspect. For example, each method of the invention may incorporate any of the features described with reference to any one of the apparatuses of the invention and vice versa. For example, any feature of the aircraft landing gear assemblies according to the first or second aspects may be provided in addition to, or alternative to, any feature of the aircraft landing gear assembly according to the sixth or seventh aspects.

DESCRIPTION OF THE DRAWINGS

Embodiments of the present invention will now be described by way of example only with reference to the accompanying schematic drawings of which:

FIG. 3 shows the outboard side view of the landing gear assembly of FIG. 1 in a third position;

FIG. 4 shows a top view of the landing gear assembly of FIG. 1;

DETAILED DESCRIPTION

Figure 1:
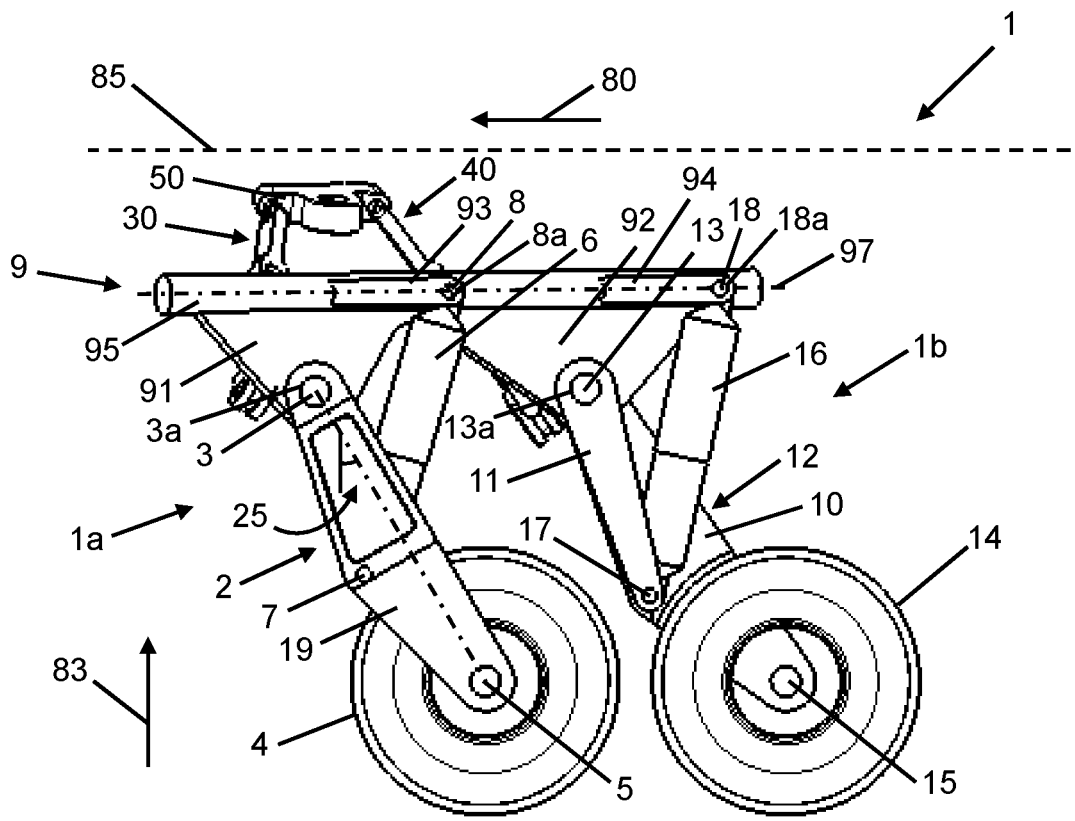
FIG. 1 shows an outboard side view of a landing gear assembly according to a first embodiment of the invention, when the landing gear assembly is in a first position.

FIG. 1 shows an outboard side view of a landing gear assembly 1 according to a first example embodiment in a first position. The first position is a fully extended configuration of the assembly 1 before making contact with the ground. In the first position, the assembly 1 has deployed ready for landing but the weight of the aircraft is not yet on the wheels. In use, the left of the assembly 1 as shown in FIG. 1 is forwards of the right of the assembly 1.

The assembly 1 comprises a first leg assembly 1a and a second leg assembly 1b. The first and second leg assemblies 1a, 1b are spaced apart in a lengthwise direction 80. The lengthwise direction 80 corresponds to a longitudinal direction of an aircraft to which the assembly 1 is to be attached, such as the aircraft 100 shown in FIGS. 5 and 6. The first leg assembly 1a is in front of the second leg assembly 1b in the lengthwise direction of the assembly 1. This means that, the first leg assembly 1a is configured to travel over a surface before the second leg assembly 1b when the assembly 1 is travelling in a straight-ahead (forward) direction. The first and second leg assemblies 1a, 1b are also spaced apart in a transverse direction, corresponding to a spanwise direction 82 of the assembly 1 perpendicular to the lengthwise direction 80 of the assembly 1, as shown in FIG. 4 and discussed in relation to FIG. 4 below. The lengthwise and spanwise directions 80, 82 of the assembly 1 correspond to the lengthwise and spanwise directions of an aircraft when the assembly 1 is attached to the aircraft.

Each of the first and second leg assemblies 1a, 1b comprises a trailing arm 2, 12, a shock absorber 6, 16, and a fuse pin 7, 17. Elements of the second leg assembly that are similar to those of the first leg assembly are denoted by the reference numeral of the first leg assembly incremented by 10. Those elements of the second leg assembly may be prefixed with the term "second", and the elements of the first leg assembly may be prefixed with the term "first". For example, the first assembly 1a comprises a first trailing arm 2, a first shock absorber 6, and a first pin 7, and the second assembly 1b comprises a second trailing arm 12, a second shock absorber 16, and a second fuse pin 17. Common elements may be referred to at the same time without such prefix, which is the approach taken in the first sentence of this paragraph.

The term "fuse pin" is a term of the art. The fuse pin 7, 17 interconnects the trailing arm 2, 12 and shock absorber 6, 16 and is a weak point in the load path of the leg assemblies 1a, 1b to interrupt the load path. The trailing arm 2, 12 and shock absorber 6, 16 are arranged to rotate with respect to each other about the fuse pin 7, 17. The assembly 1 can be said to comprise a trailing-arm suspension wherein the shock absorber 6, 16 acts against the trailing arm 2, 12.

The trailing arm 2, 12 carries a wheel 4, 14 that makes contact with the ground on landing. Each wheel 4, 14 is arranged at a distal end of the trailing arm 2, 12 and is rotatable about a respective rotation axis 5, 15. Each trailing arm 2, 12 is rotatable about a respective trailing arm axis 3, 13 arranged at a proximal end of the trailing arm 2, 12. A lengthwise direction of each first trailing arm 2, 12, as shown by the broken line extending between the proximal and distal ends of the first trailing arm is angled to the vertical 83 by an angle 25. The angle 25 of the lengthwise direction to the vertical 83 is about 30 degrees. As each trailing arm 2, 12 rotates about the respective trailing arm axis 3, 13, the angle increases. The angle increases up to a limit set by the respective and shock absorber 6, 16.

The trailing arm 2, 12 extends backwards from the trailing arm axis 3, 13 to position the rotation axis 5, 15 aft of the trailing arm axis 3, 13 in the first position of the assembly 1. Rotation of the trailing arm 2, 12 allows the distal end of the trailing arm 2, 12, and thus the wheel 4, 14, to move closer to and away from the aircraft when the landing gear assembly 1 compresses and extends, in use.

The trailing arm 2, 12 comprises a primary link member 10, 19 and a secondary link member 11 arranged side-by-side in the spanwise direction. In the views shown in FIGS. 1 and 2, both the primary link member 10 and the secondary link member 11 member of the second leg assembly 1b are visible; however, only the primary link member 19 of the first leg assembly 1a is visible because the secondary link member is concealed from view by the primary link member 19. The primary link member 10, 19 is the part of the trailing arm 3, 13 arranged to carry the wheel 4, 14 and extends between the trailing arm axis 3, 13 and the rotation axis 5, 15 about which the wheel 4, 14 rotates. The secondary link member 11 is the part of the trailing arm 2, 12 that is arranged to support the fuse pin 7, 17 in cooperation with the primary link member 10, 19. By providing the primary link member 10, 19 and the second link member 11, the trailing arms 2, 12 are structurally efficient, at least in comparison to a cantilever arrangement whereby the fuse pin 7, 17 would then be unsupported at one end. The secondary link member 11 extends between the trailing arm axis 3, 13 and the fuse pin 7, 17. The fuse pin 7, 17 extends between the primary link member 10, 19 and the secondary link member 11 and is supported by the primary link member 10, 19 and the secondary link member 19.

Each shock absorber 6, 16 is rotatable about a respective axis 8, 18 that is arranged at a proximal end of the shock absorber 6, 16. A distal end of the shock absorber 6, 16 is coupled to the fuse pin 7, 17. The shock absorber 6, 16 extends away from the axis 8, 18 towards the trailing arm 2, 12 and is coupled to a coupling location part way along a length of the trailing arm 2, 12 and between the primary link member 10, 19 and secondary link member 11 of the trailing arm 2, 12. The coupling location of the shock absorber 6, 16 is fore of the rotation axis 5, 15 of the wheel 4, 14 and about midway along the length of the primary link member 10, 19 of the trailing arm 2, 12. In other embodiments, the coupling location may be closer to one of the proximal end or the distal end of the trailing arm 2, 12 than the other end. In this embodiment, the coupling location corresponds to the location of the fuse pin 7, 17. That is, the fuse pin 7, 17 interconnects the trailing arm 2, 12 and the shock absorber 6, 16. In other embodiments, the fuse pin 7, 17 may be arranged away from the coupling location of the shock absorber 6, 16 to the trailing arm 2, 12.

Each trailing arm 2, 12 and shock absorber 6, 16 is coupled at their respective proximal end to a common pintle 9 and extends away from the common pintle 9. In the first position, each trailing arm 2, 12 and shock absorber 6, 16 extends in a downward direction towards the bottom of FIG. 1.

The fuse pin 7 is a shear pin that shears when a pre-determined threshold shear force is exceeded. In other embodiments, the fuse pin 7 may break differently than shearing. The fuse pin 7, 17 comprises a longitudinal axis that extends in a direction perpendicular to the lengthwise direction 80 when the landing gear assembly 1 is arranged in the first position, as shown in FIG. 1. This direction corresponds to a spanwise direction 82, as shown in FIG. 4. The rotation axis 5, 15 of the wheel 4, 14, the trailing arm axis 3, 13, and the axis 8, 18 of the shock absorber 6, 16 extend in the same direction as the longitudinal axis of the fuse pin 7, 17. The longitudinal axis of the fuse pin 7, 17 remains parallel to the spanwise direction 82 while the landing gear assembly 1 is extended and supports the weight of the aircraft.

In this embodiment, the common pintle 9 comprises first-to-fourth mounting portion 91, 92, 93, 94 and a rod portion 95. The first to fourth mounting portions 91, 92, 93, 94 each extend away from the rod portion 95. The first and second mounting portions 91, 92 extend away from rod portion 95 in a direction that is orthogonal to a direction in which the third and fourth mounting portions 93, 94 extend away from rod portion 95. The first and second mounting portions 91, 92 each extend away from the rod portion 95 in the downward direction when the assembly 1 is deployed, whereas the third and fourth mounting portions 93, 94 each extend away from the rod portion 95 in the downward direction when the assembly 1 is deployed.

The first mounting portion 91 supports the trailing arm 2 of the first leg assembly 1a and is arranged forward of the second mounting portion 92. An axle 3a is used to define the first trailing arm axis 3 about which the first trailing arm 2 rotates. The second mounting portion 92 supports the trailing arm 12 of the second leg assembly 1b. An axle 13a is used to define the second trailing arm axis 13 about which the second trailing arm 12 rotates. The third mounting portion 93 supports the shock absorber 6 of the first leg assembly 1a and is arranged forward of the fourth mounting portion 94. The fourth mounting portion 94 supports the shock absorber 16 of the second leg assembly 1b. A respective axle 8a, 18a is used to define each axis 8, 18 about which the shock absorbers 6, 16 rotate. The axles 3a, 13a, 8a, 18a are examples of a fixing member to couple the various components of the leg assemblies 1a, 1b together.

The rod portion 95 of the common pintle 9 is elongate with a longitudinal axis 97 extending in a diagonal direction. The longitudinal axis 97 is a common axis of the common pintle 9. The forward component of the diagonally extending rod portion 95 is shown in FIGS. 1-3 and is in a lengthwise direction 80 from an aft end of the assembly 1, on the right side of FIG. 1, to a fore end of the assembly 1, on the left side of FIG. 1.

The common pintle 9 is coupled to first and second sidestays 30, 40. The first and second sidestays 30, 40 are foldable to enable the first and second sidestays 30, 40 to collapse when retracting and unfold to straighten when deployed. Each of the first and second sidestays 30, 40 is coupled to a yoke 50 that is connectable to a structure of the aircraft, such as the fuselage. An underside 85 of the fuselage, into which the assembly 1 retracts, is indicated in FIG. 1 by the dashed horizontal line. When retracting the first and second sidestays 30, 40 are configured to roll as well as fold to enable the assembly 1 to be compact when retracted.

Figure 2:
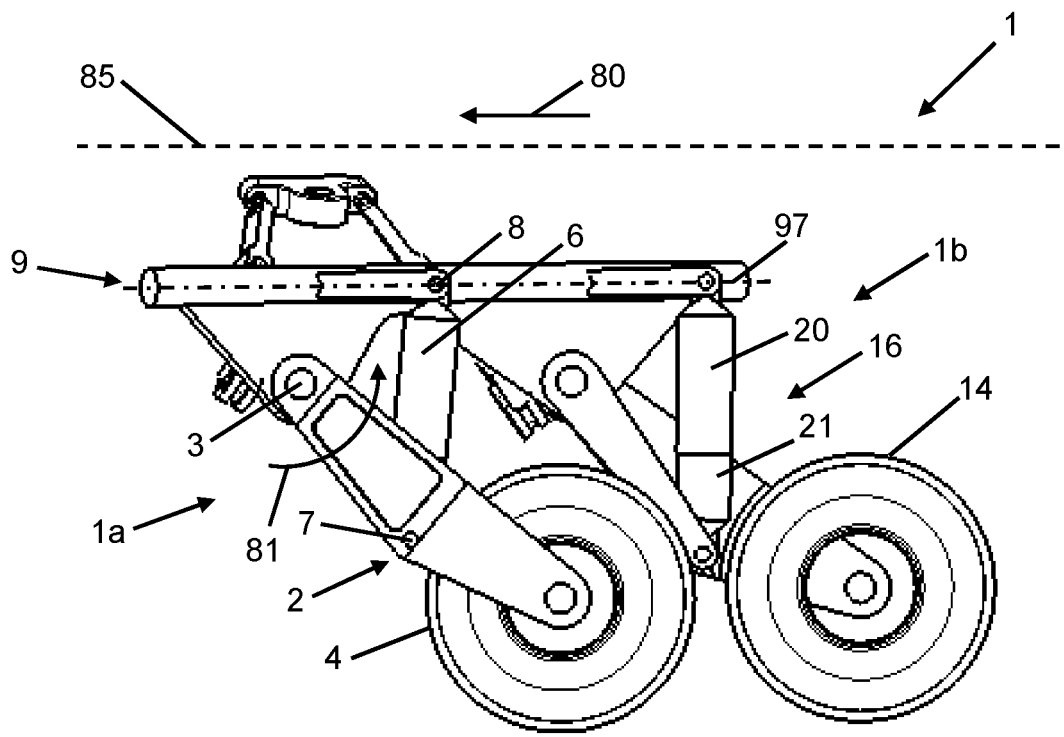
FIG. 2 shows the outboard side view of the landing gear assembly of FIG. 1 in a second position.

FIG. 2 shows the outboard side view of the landing gear assembly 1 in a second position. The second position is a loaded configuration of the assembly 1 after the wheels 4, 14 have made contact with the ground and the shock absorber 6, 16 has settled to a steady-state, for example when the aircraft is parked. In the second position, the shock absorber 6, 16 is partially compressed. The shock absorber 6, 16 comprises a limit of compression that puts the shock absorber 6, 16 in a maximum compressed state (not shown). The shock absorber 6, 16 also comprises a limit of compression that puts the shock absorber 6, 16 in a minimum compressed state. In the minimum compressed state, the each leg assembly 1a, 1b and landing gear assembly 1 is in fully extended configuration, as shown in FIG. 1. The maximum compressed state is a point at which the shock absorber 6, 16 is unable to further dampen vertical movement of the wheels 4, 14 and can be referred to as bottoming out. A discussion of the movement between the first and second positions is limited below to the first leg assembly 1a. This movement also applies independently to the second leg assembly 1b as shown in FIGS. 1 and 2. Movement of the leg assemblies 1a, 1b beyond the second position is shown in FIG. 3 and the discussion in that respect is also limited to the first leg assembly 1a.

The shock absorber 6 is configured to dampen vertical displacement of the wheel 4 (relative to the common pintle 9 and aircraft structure) on impact of the wheel 4 with the ground and as the wheel 4 rotates about the rotation axis 5 when the aircraft taxis on the ground and the wheel 4 encounters uneven surfaces. The shock absorber 6 is compressible and comprises two portions that move relative to one another on compression and extension of the shock absorber 6. The shock absorbers 6, 16 are conventional shock absorbers, which are well-known, so a detailed discussion of the shock absorbers 6, 16 is omitted. The two portions 20, 21 shown in FIG. 2 are in relation to the shock absorber 16 of the second leg assembly 1b; however, the shock absorber 6 of the first leg assembly 1a also comprises two portions. In FIG. 1, the shock absorber 6 is in an extended state in which the two portions 20, 21 are displaced away from each other. In FIG. 2, the shock absorber 6 is in a compressed state, such that the two portions 20, 21 have been brought towards each other by a load exerted on the wheel 4 on touchdown.

Rotation of the trailing arm 2 about the trailing arm axis 3 causes the wheel 4 to displace vertically with respect to the common pintle 9 according to interaction of the assembly 1 with the ground. On impact with the ground, and as a result of interaction with any ground surface changes, the wheel 4 is pushed towards the common pintle 9 and so that the transfer of energy of the impact on the common pintle 9 is dampened by the shock absorber 6. The load applied to the wheel 4 is transferred to the trailing arm 2, the fuse pin 7 and the shock absorber 6. The transferred load is opposed by the shock absorber 6. In response, the shock absorber 6 compresses to reduce an effective length of the shock absorber 6 between the distal and proximal ends of the shock absorber 6. As the shock absorber 6 compresses, the fuse pin 7, distal end of the trailing arm 2, and wheel 4 move in combination towards the common pintle 9. The impact causes the trailing arm 2 to rotate in an anti-clockwise direction around the trailing arm axis 3. The anti-clockwise direction is represented by curved arrow 81. The rotation of the trailing arm 2 causes a horizontal distance between the rotation axis 5 of the wheel 4 and the trailing arm axis 3 in the lengthwise direction 80 to increase and a vertical distance between the rotation axis 5 of the wheel 4 and the trailing arm axis 3 to decrease. As the wheel 4 and trailing arm 2 are brought closer to the common pintle 9, the shock absorber 6 compresses as the two portions 20, 21 of the shock absorber 6 are brought closer together compared to the fully extended configuration shown in FIG. 1. The shock absorber 6 also rotates about the axis 8 in the same anti-clockwise direction as the trailing arm 2 rotates. The interconnection of the fuse pin 7 with the trailing arm 2 and the shock absorber 6 causes relative rotation of the trailing arm 2 and shock absorber 6 about their respective axes 3, 8 and results in proportional rotational movement of the trailing arm 2 and shock absorber 6.

In normal operation of the assembly 1, the trailing arm 2 and wheel 4 rotate about the trailing arm axis 3 within a normal operating range. The normal operating range is the range of rotational movement of the trailing arm 2 and wheel 4 from the first position shown in FIG. 1 to the second position shown in FIG. 2.

FIG. 3 shows the outboard side view of the landing gear assembly 1 in a third position. In FIG. 3, rotational movement of the trailing arm 2 and wheel 4 about the trailing arm axis 3 is beyond the normal operating range. This occurs when the fuse pin 7 breaks and the trailing arm 2 and shock absorber 6 become decoupled. As a consequence the landing gear has failed into a relatively compact configuration such that intrusion into the aircraft beyond the landing gear bay is prevented.

Vertical loads applied to the wheel 4 can cause the shock absorber 6 to fully compress to the maximum compressed state. Vertical loads above a pre-determined threshold are unable to be absorbed by the shock absorber 6 beyond the maximum compressed state because the shock absorber 6 has reached a limit of compression. The fuse pin 7, being a weak point in the load path of the leg assembly 1a, enables the first leg assembly 1a to fail in a pre-determined order. When the vertical load acting on the leg assembly 1a and the fuse pin 7 exceeds the pre-determined threshold, the fuse pin 7 is unable to remain intact and therefore breaks. Such forces may be high enough to cause a tyre, fitted to the wheel 4, to fail. The interconnection of the trailing arm 2 and the shock absorber 6 via the fuse pin 7 is removed when the fuse pin 7 breaks. This enables the trailing arm 2 to rotate free of the shock absorber 6 in the anti-clockwise direction 81 beyond the limit of rotation caused by the maximum compressed state of the shock absorber 6. The wheel 4 is forced towards the common pintle 9 beyond the normal operating range by contact between the assembly 1 and the ground. This results in an underside 87 of the aircraft making contact with the ground which restricts further load on the assembly 1 and rotation of the trailing arm 2. In that position, as shown in FIG. 3, the rotation axis 5 of the wheel 4 is above the trailing arm axis 3 and level with the longitudinal axis 97 of the rod portion 95 of the common pintle 9 in the vertical direction 83. Further rotation of the trailing arm 2 and wheel 4 about the trailing arm axis 3 is inhibited by the underside 87 of the aircraft making contact with the ground. Thus, the leg assembly 1a collapses into a compact configuration.

The common connection of the first and second leg assemblies 1a, 1b to the common pintle 9 results in the cooperative movement of the first and second leg assemblies 1a, 1b when retracting or extending. However, the trailing arm 2, 12 and wheel 4, 14 of each first and second leg assembly 1a, 1b is capable of independent rotation about their respective trailing arm axis 3, 13 within and beyond the normal operating range. The shock absorber 6, 16 of each of the first and second leg assemblies 1a, 1b is also independently rotatable about their respective axes 8, 18 despite being also moveable cooperatively when the assembly 1 is retracted or extended.

FIG. 4 shows a top view of the landing gear assembly 1 in the first position, as also shown in FIG. 1. In the first position, the first leg assembly 1a is located forward and outboard of the second leg assembly 1b. The trailing arm 2 and wheel 4 of the first leg assembly 1a are shown spaced apart from the trailing arm 12 and wheel 14 of the second leg assembly 1b in the lengthwise direction 80. The assembly 1 comprises a spanwise offset 40 that spaces apart the first and second leg assemblies 1a, 1b. The trailing arm 2 and wheel 4 of the first leg assembly 1a are shown spaced apart from the trailing arm 12 and wheel 14 of the second leg assembly 1b in the spanwise direction 82.

As shown in FIG. 4, the rod portion 95 of the common pintle 9 also extends in the spanwise direction 82 from the aft end such that the first leg assembly 1a is forward and outboard of the second leg assembly 1b. The lengthwise and sideways components of the diagonally extending rod portion 95 of the common pintle 9 are shown in FIG. 4. The longitudinal axis 97 of the rod portion 95 is inclined to the lengthwise direction 80 and the spanwise direction 82. The angle of inclination with respect to each direction exceeds 10 degrees. For example, a first angle 98, representing the angle of the longitudinal axis 97 to the lengthwise direction 80, is around 25 degrees, and a second angle 99, representing the angle of the longitudinal axis 97 to the spanwise direction 82, is around 65 degrees. In other embodiments, the first angle 98 and second angle 99 may be different.

The first and second sidestays 30, 40 each comprise a first portion 31, 41 and a second portion 32, 42 that move relative to one another when the first and second sidestays 30, 40 folds. The first portion 31, 41 is coupled to the common pintle 9 and adjacent the common pintle 9 when the assembly 1 is in the first position. The second portion 32, 42 is coupled to the yoke 50 and is further from the common pintle 9 compared to the first portion 31, 41 when the assembly 1 is in the first position. It will be appreciated that other arrangements could be used.

The landing gear assembly 1 extends and retracts by movement of an actuation mechanism 60. The actuation mechanism 60 comprises a linear actuator 61 to extend and retract the second sidestay 40. The actuation mechanism 60 is shown in more detail in FIGS. 9 and 10 and is discussed further below. It is appreciated that other arrangements for moving the landing gear assembly 1 towards and away from the fully extended configuration are possible.

Figure 5:
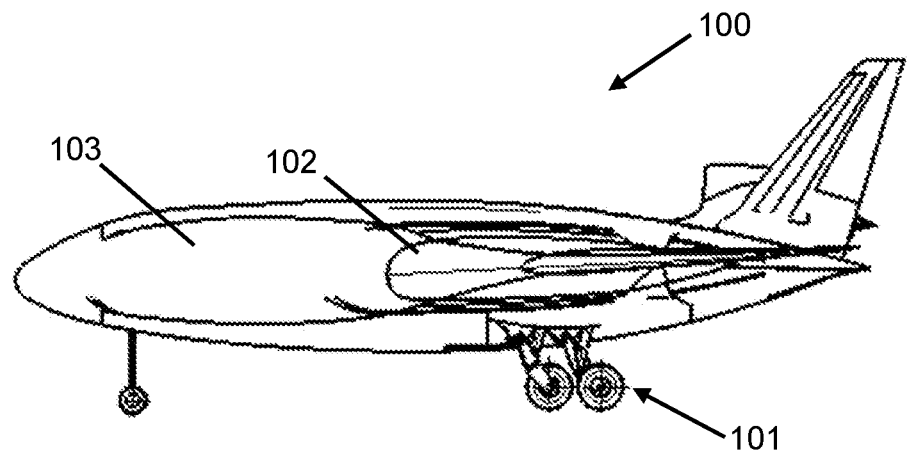
FIG. 5 shows a side view of an aircraft with a landing gear assembly extended according to a second embodiment of the invention.
Figure 6:
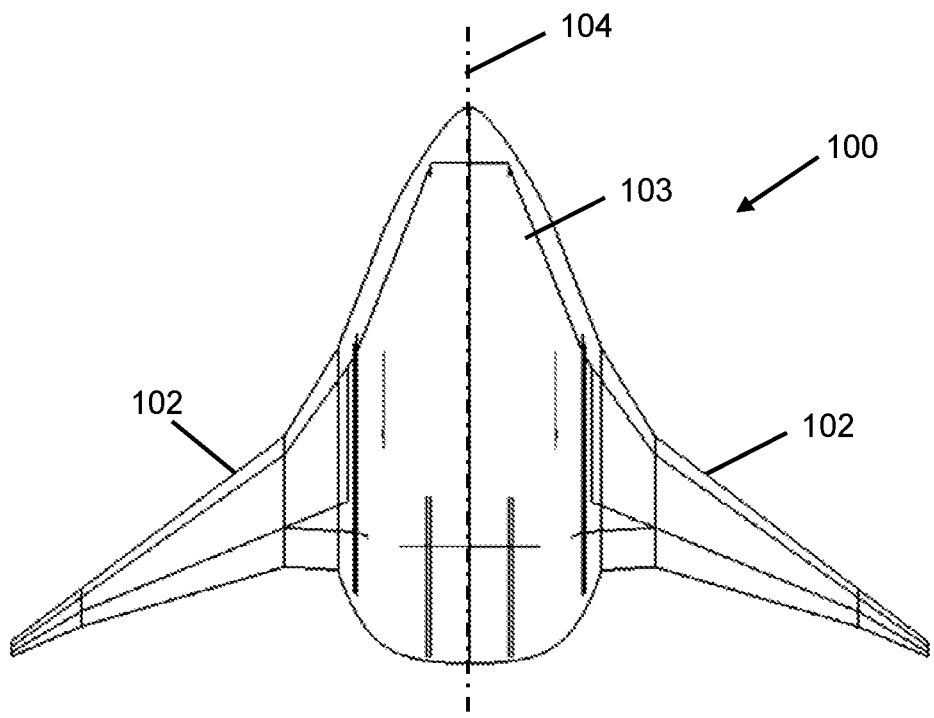
FIG. 6 shows a bottom view of the aircraft of FIG. 5 with the landing gear assembly stowed.

FIGS. 5 and 6 show a respective side view and top view of an aircraft 100 including a landing gear 101 as described above. The aircraft 100 shown in FIGS. 5 and 6 is a blended wing aircraft, wherein the wings 102 and body 103 blend smoothly without an abrupt join. In this embodiment, the landing gear 101 is mounted on the body 103 of the aircraft 100. Landing gear 101 is arranged on either side of a centreline 104 of the aircraft 100. While FIG. 5 shows landing gear 101 mounted on the body 103, in other embodiments the landing gear may be a nose landing gear or may be mounted on the wing 102 of the aircraft 100. Each landing gear 101 of FIGS. 5 and 6 may comprise the landing gear assembly 1 according to the first embodiment or any other alternative embodiment described herein.

Figure 7A:
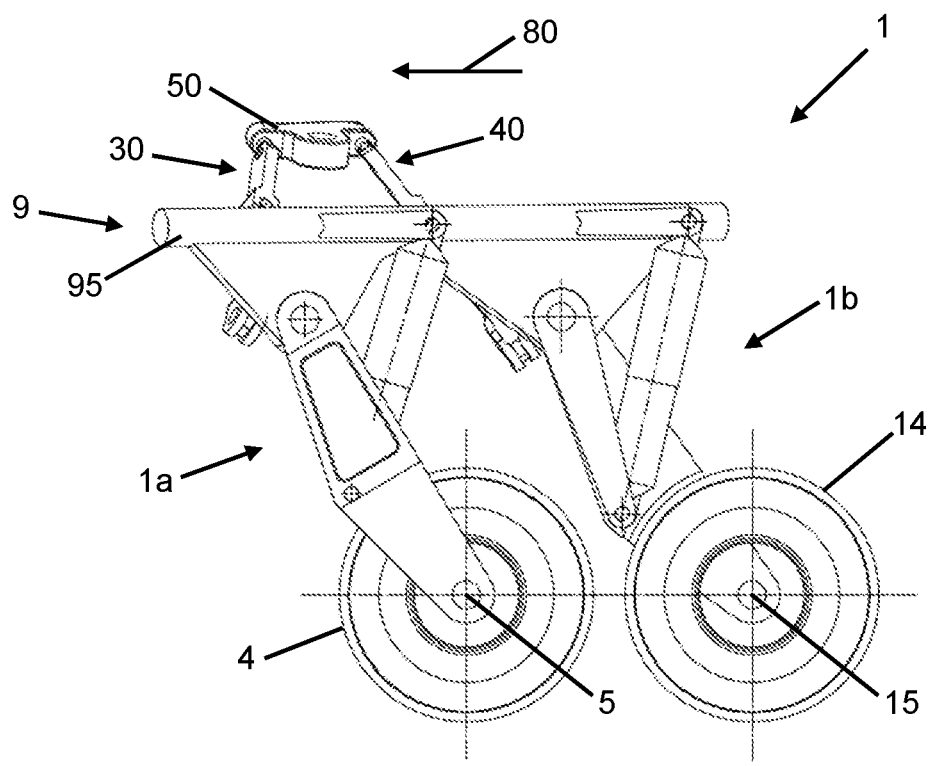
FIGS. 7a to 7e each show an outboard side view of a successive stage of retraction of the landing gear assembly.
Figure 7B:
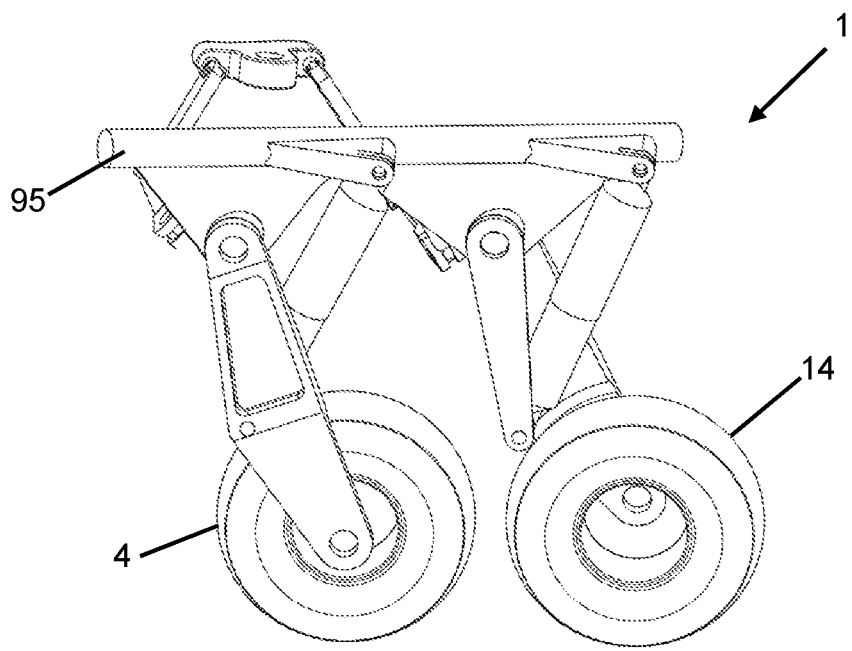
Figure 7C:
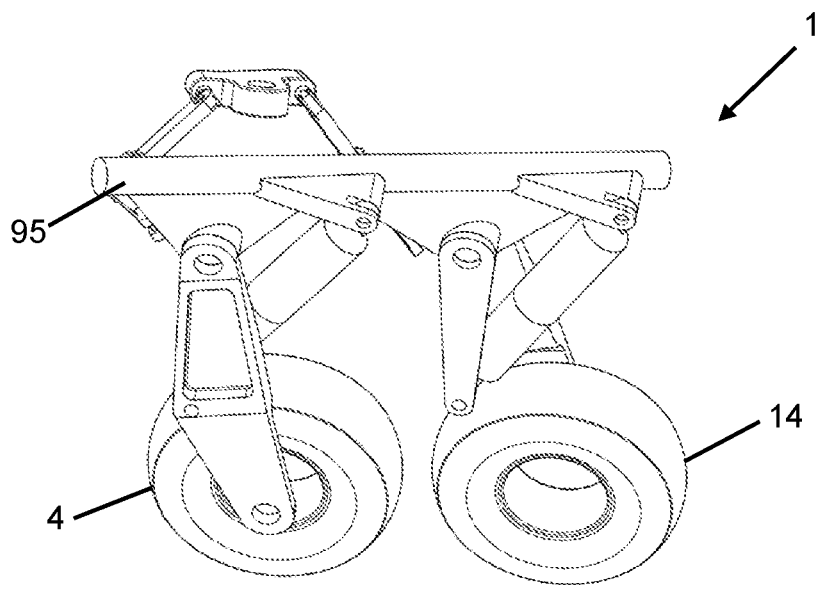
Figure 7D:
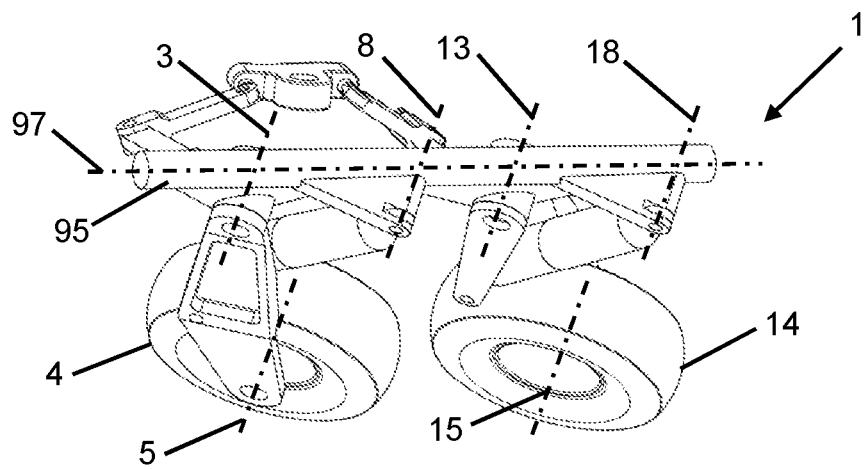
Figure 7E:
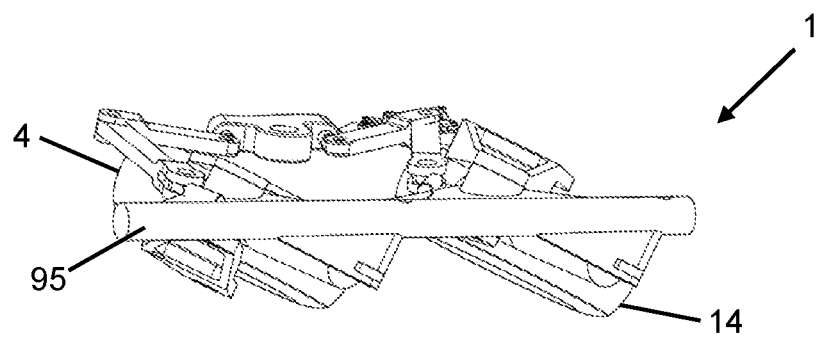
Figure 8A:
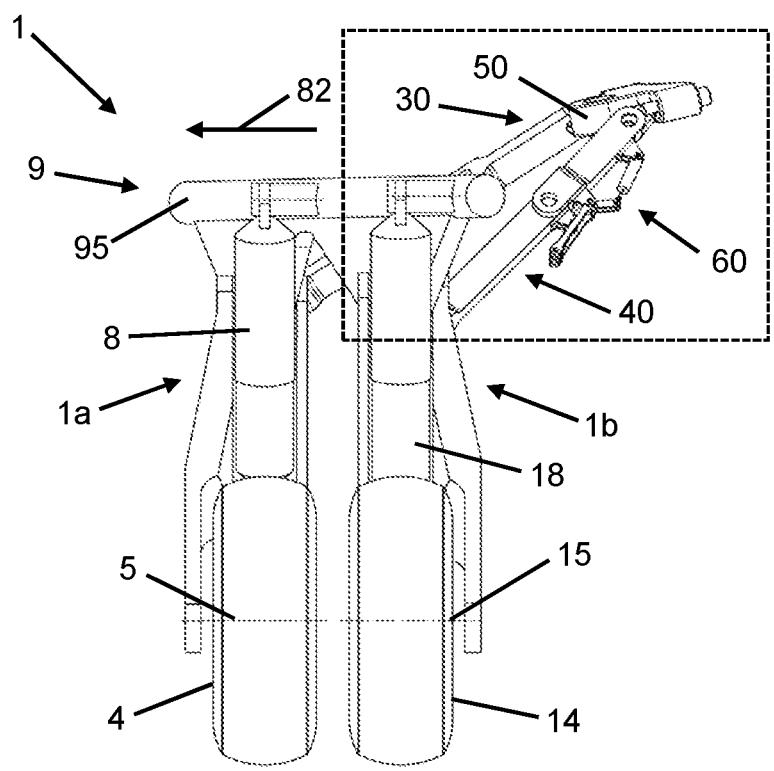
FIGS. 8a to 8e each show a corresponding aft view of each successive stage of FIGS. 7a-e, respectively.
Figure 8B:
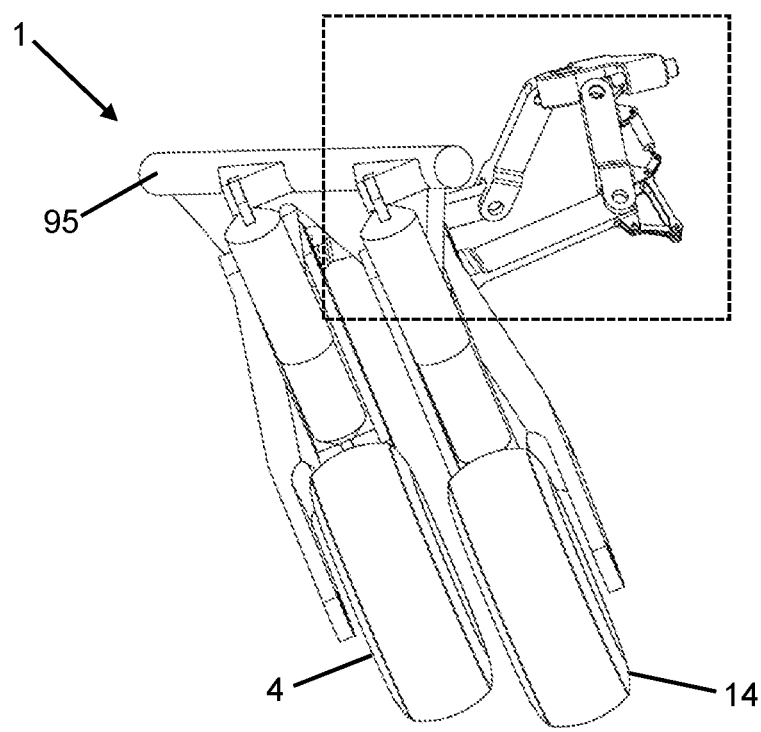
Figure 8C:
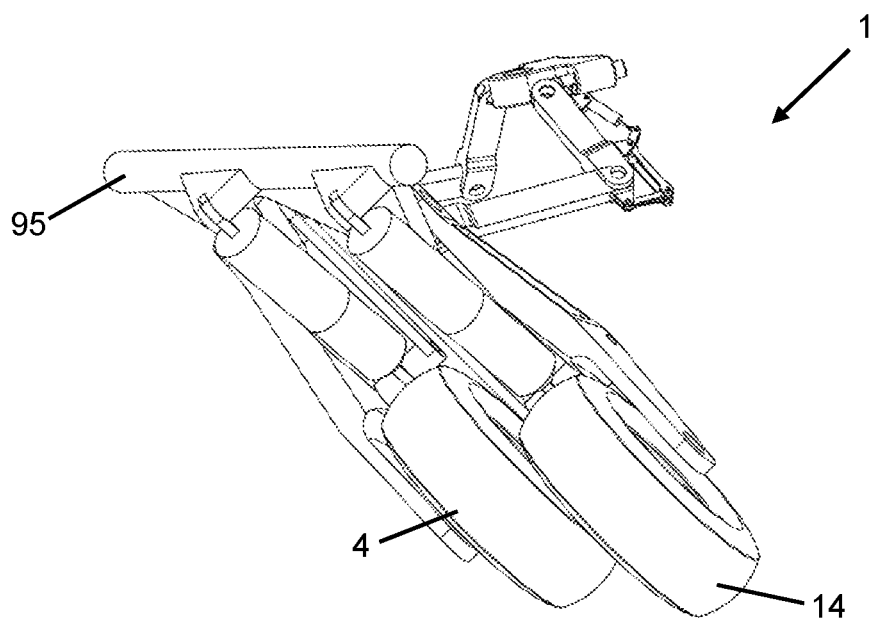
Figure 8D:
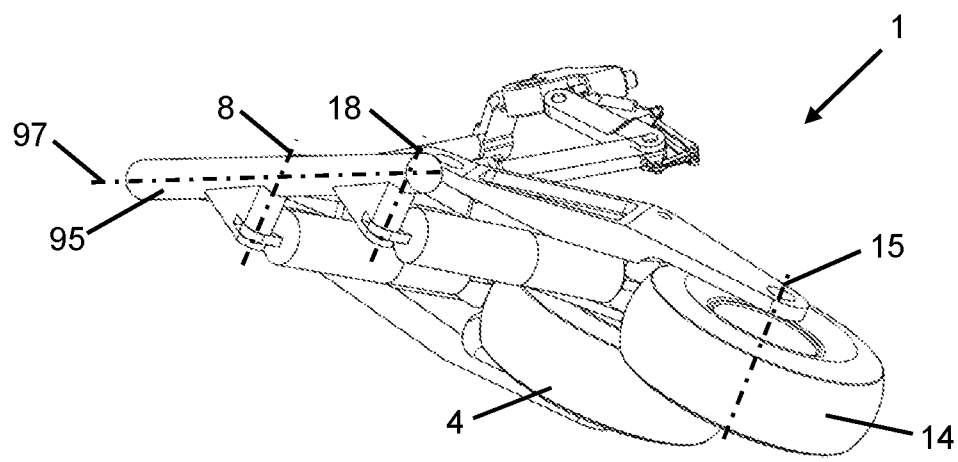
Figure 8E:
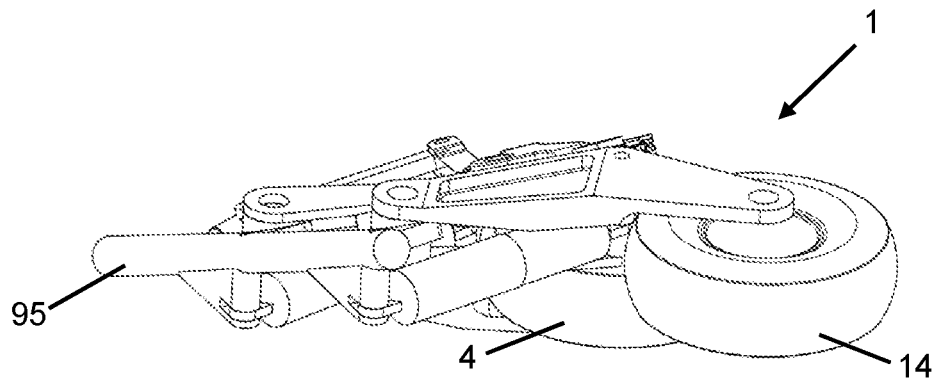

FIGS. 7a to 7e each show an outboard side view of a successive stage of retraction of the landing gear assembly 1 and FIGS. 8a to 8e each show a corresponding aft view, respectively. To extend the landing gear assembly 1, the stages are reversed. In FIGS. 7a and 8b, the assembly 1 is arranged in the fully extended configuration. In FIGS. 7e and 8e, the assembly 1 is arranged in a fully retracted configuration such that the assembly 1 can be stowed in a landing gear bay. In each of FIGS. 7b to 7d, and FIGS. 8b to 8d, the assembly 1 is arranged in one of three intermediate configurations.

To retract the landing gear assembly 1 from the fully extended configuration shown in FIGS. 7a and 8b, the actuation mechanism 60 causes the first and second sidestays 30, 40 to fold toward each other. This causes respective joints, about which the first and second sidestays 30, 40 fold, to move away from each other in the lengthwise direction 80 of the assembly 1. The folding of the first and second sidestays 30, 40 draws the first and second mounting portions 91, 92 of the common pintle 9 towards the yoke 50. The connection of each of the first and second leg assemblies 1a, 1b to the respective first and second mounting portions 91, 92 causes the first and second leg assemblies 1a, 1b to rotate about the longitudinal axis 97 of the rod portion 95 and the wheels 4, 14 to move upwardly and inwardly towards the yoke 50.

As the first and second leg assemblies 1a, 1b to rotate, the wheels 4, 14 twist and become misaligned with respect to the lengthwise direction 80 of the assembly 1. In the fully extended configuration, as shown in FIGS. 7a and 8a, the wheels 4, 14 are aligned with the lengthwise direction 80. The wheels 4, 14 become progressively misaligned as the assembly 1 retracts to the fully extended configuration, as shown in FIGS. 7e and 8e. This twisting motion keeps the respective rotation axes 5, 15 parallel while the assembly 1 retracts and extends. Beneficially, the assembly 1 is able to have a compact arrangement in the lengthwise direction 80 of the assembly 1 when fully retracted and stowed in a landing gear bay.

In the fully extended configuration, shown in FIGS. 7a and 8a, the rotational axes 5, 15 of the wheels 4, 14 are perpendicular to the lengthwise direction 80 and parallel to the spanwise direction 82. However, in the fully retracted configuration, shown in FIGS. 7e and 8e, the rotational axes 5, 15 of the wheels 4, 14 are arranged differently and are no longer perpendicular to the lengthwise direction 80 or parallel to the spanwise direction 82. This change in alignment of the rotational axes 5, 15 is caused by a respective angular offset of the rotational axes 5, 15, the trailing arm axes 3, 13, and the axes 8, 18 of the shock absorber 6, 16 with the longitudinal axis 97 of the rod portion 95 of the common pintle 9. These respective angular offsets are discernible from FIGS. 7d and 8d, which demonstrate the relative positions of these axes in one of the intermediate configurations of the assembly 1. This arrangement allows the assembly 1 to be compact when fully retracted, particularly with respect to the lengthwise direction 80, which may be beneficial when a length dimension of a landing gear bay (into which the assembly 1 retracts) is compromised.

Beneficially, the landing gear assembly 1 comprises a retraction path that is different to a path in which the leg assemblies 1a, 1b are configured to move when failing on the receipt of a vertical load above the pre-determined threshold. This can help to accelerate the collapse of the leg assemblies 1a, 1b in a rare scenario in which vertical loads above the pre-determined threshold are received. When the landing gear assembly 1 retracts, the fuse pin 7, 17 remains intact, whereas, when the landing gear assembly 1 collapses, the fuse pin 7, 17 fails by breaking.

As shown in FIG. 8a, a width of each shock absorber 8, 18 is less than a width of each wheel 4, 14 and within a spanwise space of each wheel 4, 14. This allows an extent each shock absorber 8, 18 in the spanwise direction 82 to be minimised so that the aircraft landing gear assembly 1 can be compact when retracted.

Figure 9:
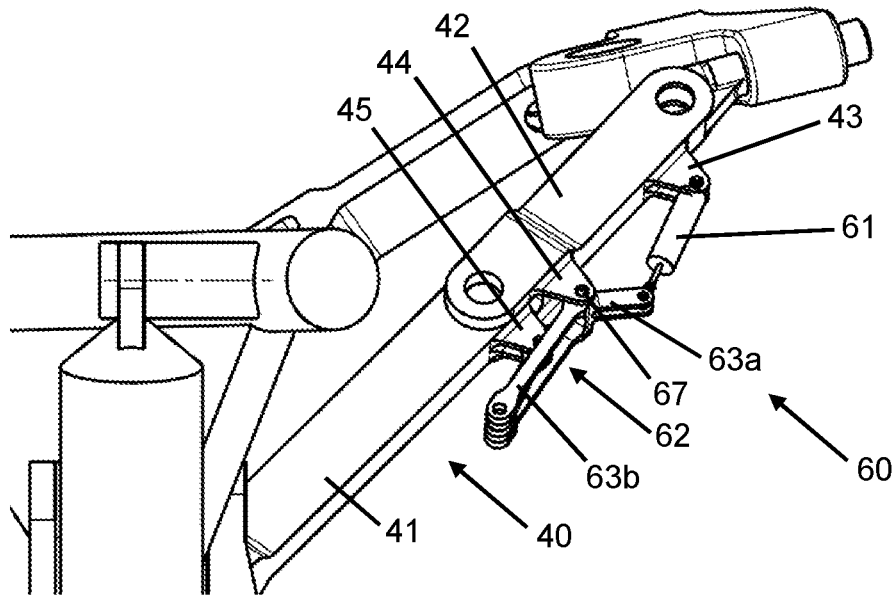
FIG. 9 shows an aft view of an actuation mechanism in the first configuration according to the first embodiment of the invention.
Figure 10:
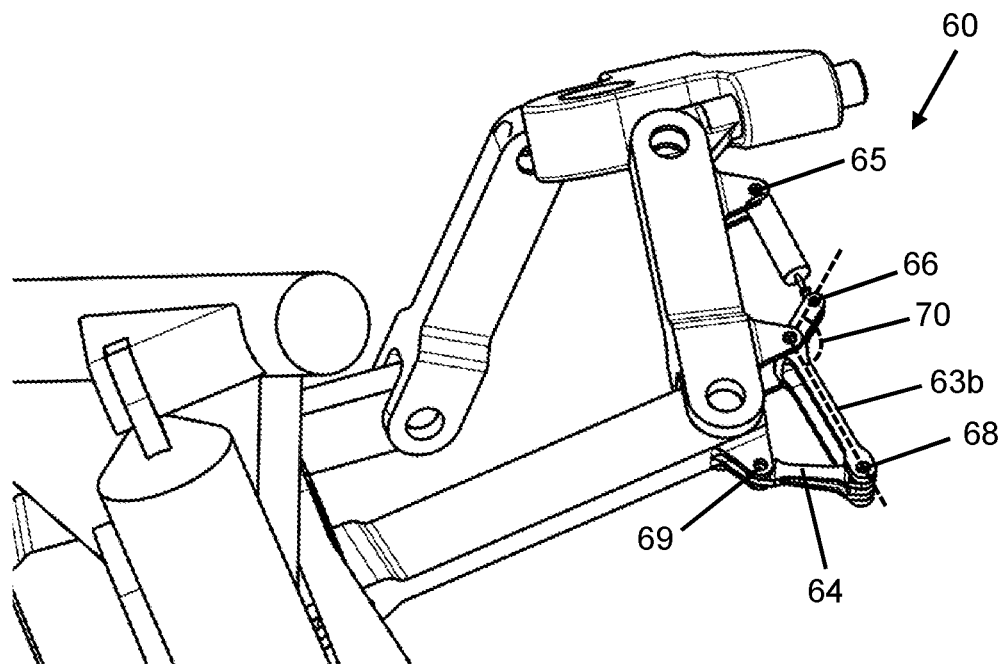
FIG. 10 shows an aft view of the actuation mechanism in a second configuration according to the first embodiment of the invention.

FIGS. 9 and 10 show an enlarged view of the portions of the aircraft landing gear assembly 1 that are enclosed by a box with broken lines in FIGS. 8a and 8b, respectively. FIG.

9 shows a first configuration of the actuation mechanism 60 and second sidestay 40 when the assembly 1 is in a fully extended configuration. FIG. 10 shows the actuation mechanism 60 and second sidestay 40 in a second configuration when the assembly 1 is in an intermediate configuration away from the fully extended configuration. The actuation mechanism 60 enables the aircraft landing gear assembly 1 to retract and extend by exerting a force on the second sidestay 40.

The second sidestay 40 comprises first-to-third mounting portions 43, 44, 45. The first and second mounting portions 43, 44 are part of the second portion 42 of the second sidestay 40 and are arranged at opposite ends of the second portion 42. The third mounting portion 45 is part of the first mounting portion 41 of the second sidestay 40 and is arranged at the end of the first mounting portion 41 closest to the second mounting portion 42. The second mounting portion 44 is thus arranged in-between the first and third mounting portions 43, 45. The first-to-third mounting portions 43, 44, 45 extend away from an outer side of the second sidestay 40.

The actuation mechanism 60 comprises the linear actuator 61, a first link member 62, and a second link member 64. The first link member 62 is pivotably coupled to the linear actuator 61 and the second link member 64.

One end of the linear actuator 61 is pivotally coupled to the first mounting portion 43 of the second sidestay 40 and is arranged to pivot with respect to the first mounting portion 43 about a first axis 65. An opposite end of the linear actuator 61 is pivotally coupled to a first portion 63a of the first link member 62 and is arranged to pivot with respect to the first link member 62 about a second axis 66. The first link member 62 is pivotally coupled to the second mounting portion 44 and pivots about a third axis 67. A second portion 63b of the first link member 62 is pivotally coupled to one end of the second link member 64 and is arranged to pivot with respect to the second link member 64 about a fourth axis 68. An opposite end of the second link member 64 is pivotably coupled to the third mounting portion 45 and is arranged to pivot with respect to the third mounting portion 45 about a fifth axis 69.

The first and second portions 63a, 63b of the first link member 62 extend away from the third axis 67 and are arranged at an interior angle 70 with respect to each other. In this example, the interior angle is between 90 and 180 degrees. The interior angle 70 is fixed to constrain the first and second portions 63a, 63b relative to each other.

The linear actuator 61 extends and retracts to manipulate the second sidestay 40 between an unfolded and folded configuration. In the first configuration, shown in FIG. 9, the second portion of the 63b of the first link member 62 is substantially parallel to the second link member 64 and each extend away from their respective mounting portion 44, 45 in the same direction. When the second sidestay 40 is moved away from the unfolded configuration, by the actuation mechanism 60 moving to a second configuration, as shown in FIG. 10, the second portion of the 63b of the first link member 62 is pivoted away from the second link member 64.

A single actuation mechanism 60 is provided on the aircraft landing gear assembly 1. However, in other embodiments, the aircraft landing gear assembly 1 may comprise more than one actuation mechanism 60.

Figure 11:
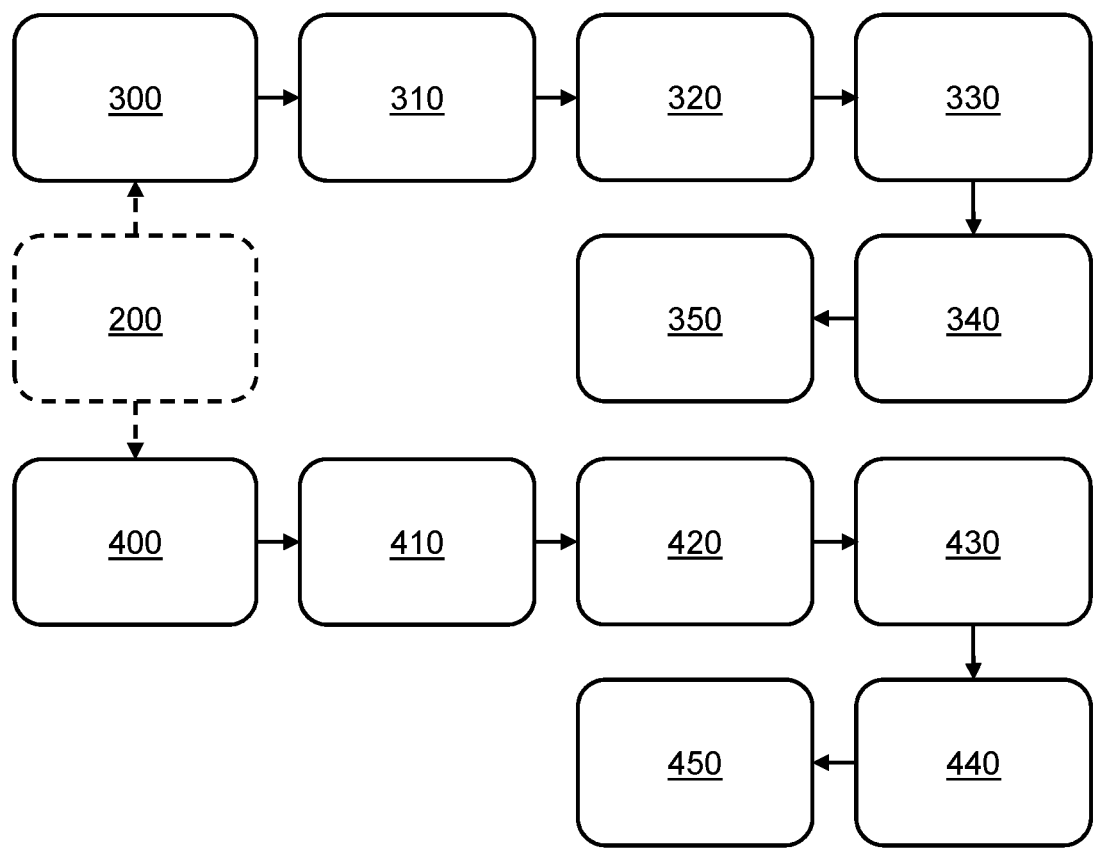
FIGS. 11 and 12 show example methods in accordance with the invention.

FIG. 11 shows a flow chart of a method of operating an aircraft landing gear assembly, for example the landing gear assembly 1 according to the first embodiment. A vertical load 300 applied to a first wheel carried by a first trailing arm causes the first trailing arm to rotate 310 about a first trailing arm axis. The rotation of the first trailing arm is inhibited 320 by a first shock absorber within a normal operating range and limited by a maximum compressed state of the first shock absorber. When the vertical load acting on the assembly in the maximum compressed state of the first shock absorber exceeds a pre-determined threshold, the vertical load causes failure 330 of a first fuse member coupled to the first shock absorber. The failure of the first fuse member decouples 340 the first shock absorber from the first trailing arm and allows the first trailing arm to further rotate 350 beyond the normal operating range to safely collapse the aircraft landing gear assembly.

Optionally, a vertical load 400 applied to a second wheel carried by a second trailing arm causes the second trailing arm to rotate 410 about a second trailing arm axis. The rotation of the second trailing arm is inhibited 420 by a second shock absorber within a normal operating range and limited by a maximum compressed state of the second shock absorber. When the vertical load acting on the assembly in the maximum compressed state of the second shock absorber exceeds a pre-determined threshold, the vertical load causes failure 430 of a second fuse member coupled to the second shock absorber. The failure of the second fuse member decouples 440 the second shock absorber from the second trailing arm and allows the second trailing arm to further rotate 450 beyond the normal operating range to safely collapse the aircraft landing gear assembly. The retracted configuration of the landing gear is different to a configuration of the landing gear assembly when collapsed.

Optionally, the first leg assembly and the second leg assembly move from a retracted configuration to the extended configuration by rotating 200 the first leg assembly and the second leg assembly about a longitudinal axis of the common pintle. Optionally, the first and second trailing arms independently rotate 310, 410, 350, 450 about the respective first and second trailing arm axes when the vertical load is applied. Optionally, the first and second wheels space apart from each other in a spanwise direction in the extended configuration.

Figure 12:
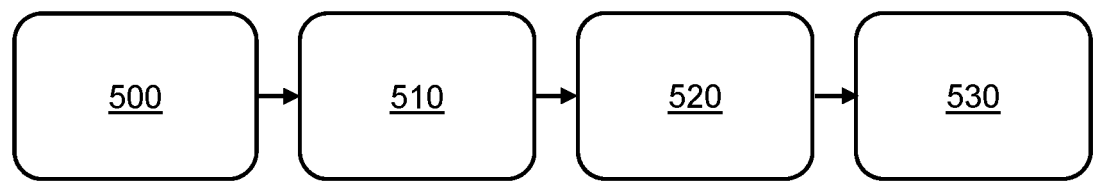

FIG. 12 shows another method of operating an aircraft landing gear assembly, for example using the landing gear assembly 1 according to the first embodiment. When the landing gear assembly 1 is in an extended configuration, a vertical load 500 applied to a first and second wheel of a respective first and second leg assembly coupled to the common pintle. The first and second wheels are carried by a first and second trailing arm, respectively. The vertical load 500 causes the first and second trailing arm to rotate 510 about a first and second trailing arm axis, respectively. The first and second leg assemblies move 520 from a retracted configuration to the extended configuration by rotating 530 the trailing arms about a longitudinal axis of the common pintle.

Optionally, in the extended configuration, the first wheel of the first leg assembly is spaced apart from the second wheel of the second leg assembly in a spanwise direction and/or lengthwise direction of the aircraft landing gear assembly.

Whilst the present invention has been described and illustrated with reference to particular embodiments, it will be appreciated by those of ordinary skill in the art that the invention lends itself to many different variations not specifically illustrated herein. By way of example only, certain possible variations will now be described. The trailing arm 2, 12 may comprise a single link member rather than two link members and may comprise a different shape than that shown in the figures. The arrangement of the sidestays 30, 40 may be different to what is shown in the figures and as discussed above. For example, more than two sidestays 30, 40 may be provided and each sidestay 30, 40 may fold at two or more points rather than one. In some embodiments, the sidestay may not fold, but instead be a telescoping sidestay. In other embodiments, the aircraft may be a fixed wing aircraft that is not a blended wing aircraft.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft landing gear assembly comprising:
   a first leg assembly comprising:
      a first trailing arm configured to carry a first wheel and to rotate about a first trailing arm axis when the aircraft landing gear assembly is in an extended configuration;
      a first shock absorber configured to dampen rotation of the first trailing arm about the first trailing arm axis within a normal operating range, and to limit the rotation of the first trailing arm about the first trailing arm axis to the normal operating range;
      a first fuse member coupled to the first shock absorber, and configured to fail in the event a vertical load on the first wheel exceeds a pre-determined threshold, and
      wherein the first trailing arm is coupled to the first shock absorber by the first fuse member such that failure of the first fuse member causes the first shock absorber and the first trailing arm to become decoupled and the first trailing arm to rotate about the first trailing arm axis beyond the normal operating range.

2. The aircraft landing gear assembly according to claim 1, wherein the first trailing arm is coupled to the first shock absorber by the first fuse member such that failure of the first fuse member causes the first shock absorber and the first trailing arm to become decoupled.

3. The aircraft landing gear assembly according to claim 1, wherein the first fuse member is located part way along the first trailing arm.

4. The aircraft landing gear assembly according to claim 1, wherein the first trailing arm is configured to carry a single wheel only.

5. The aircraft landing gear assembly according to claim 1, wherein, failure of the first fuse member allows the first trailing arm to freely rotate about the first trailing arm axis such that at least part of the first wheel mounted to the first trailing arm is located above the first trailing arm axis.

6. The aircraft landing gear assembly according to claim 1, comprising:
   a common pintle configured to mount the aircraft landing gear assembly to an aircraft and to rotate when the aircraft landing gear assembly moves towards and away from the extended configuration;
   a second leg assembly comprising:
      a second trailing arm configured to carry a second wheel and to rotate about a second trailing arm axis when the aircraft landing gear assembly is in the extended configuration;
      a second shock absorber configured to dampen rotation of the second trailing arm about the second trailing arm axis within a normal operating range, and to limit the rotation of the second trailing arm about the second trailing arm axis to the normal operating range; and
      a second fuse member coupled to the second shock absorber, and configured to fail in the event a vertical load on the second wheel exceeds a pre-determined threshold, wherein failure of the second fuse member allows the second trailing arm to rotate about the second trailing arm axis beyond the normal operating range;
   wherein the first and second leg assemblies are coupled to the common pintle, and the first and second trailing arms are configured to independently rotate about the respective first and second trailing arm axes.

7. The aircraft landing gear assembly according to claim 6, wherein the first and second leg assemblies are spaced apart from each other in a spanwise direction of the aircraft landing gear assembly.

8. The aircraft landing gear assembly according to claim 6, wherein, when the aircraft landing gear assembly is in the extended configuration, the first and second leg assemblies are spaced apart from each other in a lengthwise direction of the aircraft landing gear assembly.

9. An aircraft comprising the aircraft landing gear assembly according to claim 1.

10. The aircraft according to claim 9, wherein the landing gear assembly is mounted to the aircraft by a common pintle mounting such that the common pintle mounting rotates when the aircraft landing gear assembly moves towards and away from the extended configuration, the landing gear assembly further comprising;
   a second leg assembly comprising:
      a second trailing arm configured to carry a second wheel and to rotate about a second trailing arm axis when the aircraft landing gear assembly is in the extended configuration;
      a second shock absorber configured to dampen rotation of the second trailing arm about the second trailing arm axis within a normal operating range, and to limit the rotation of the second trailing arm about the second trailing arm axis to the normal operating range; and
      a second fuse member coupled to the second shock absorber, and configured to fail in the event a vertical load on the second wheel exceeds a pre-determined threshold, wherein failure of the second fuse member allows the second trailing arm to rotate about the second trailing arm axis beyond the normal operating range;
and wherein the first and second leg assemblies are coupled to the common pintle, and the first and second trailing arms are configured to independently rotate about the respective first and second trailing arm axes, and the first and second leg assemblies are arranged on the same spanwise side of a centreline of the aircraft.

11. A method of operating an aircraft landing gear assembly, the aircraft landing gear assembly comprising:
   a first leg assembly comprising:
      a first trailing arm carrying a first wheel;

a first shock absorber; and a first fuse member coupled to the first shock absorber;

wherein, during normal operation when the aircraft landing gear assembly is in an extended configuration, the first trailing arm rotates about a first trailing arm axis in response to a vertical load applied to the first wheel, the rotation of the first trailing arm being damped by the first shock absorber within a normal operating range, and being limited by the first shock absorber to the normal operating range; and wherein, in the event that the vertical load acting on the first wheel exceeds a pre-determined threshold, the first fuse member fails such that the first trailing arm rotates beyond the normal operating range, and wherein the first trailing arm is coupled to the first shock absorber by the first fuse member such that failure of the first fuse member causes the first shock absorber and the first trailing arm to become decoupled and the first trailing arm to rotate about the first trailing arm axis beyond the normal operating range.

12. The method according to claim 11, wherein failure of the first fuse member causes the first shock absorber to become decoupled from the first trailing arm.

13. The method according to claim 11, the aircraft landing gear assembly comprising:

a second leg assembly comprising:
  a second trailing arm carrying a second wheel;
  a second shock absorber; and
  a second fuse member coupled to the second shock absorber;

a common pintle coupled to the first and second leg assemblies, and rotatably mounted to an aircraft;

wherein, during normal operation when the aircraft landing gear assembly is in the extended configuration, the second trailing arm rotates about a second trailing arm axis in response to a vertical load applied to the second wheel, the rotation of the second trailing arm being damped by the second shock absorber within a normal operating range, being limited by the second shock absorber to the normal operating range, and being independent of the rotation of the first trailing arm about the first trailing arm axis; and wherein, in the event that the vertical load acting on the second wheel exceeds a pre-determined threshold, the second fuse member fails such that the second trailing arm rotates beyond the normal operating range independently of the rotation of the first trailing arm about the first trailing arm axis.

14. The method according to claim 13, wherein the method comprises moving the first leg assembly and the second leg assembly from a retracted configuration to the extended configuration by rotating the first leg assembly and the second leg assembly about a longitudinal axis of the common pintle.

15. The method according to claim 13, wherein in the extended configuration, the first and second wheels are spaced apart from each other in a spanwise direction of the aircraft landing gear assembly.

16. An aircraft landing gear assembly comprising:

a common pintle configured to mount the aircraft landing gear assembly to an aircraft and to rotate when the aircraft landing gear assembly moves towards and away from an extended configuration;

a first and second leg assembly coupled to the common pintle and spaced apart with a spanwise offset, each of the first and second leg assemblies comprising:
  a trailing arm configured to carry a wheel and rotate about a trailing arm axis when the aircraft landing gear assembly is in the extended configuration;
  a shock absorber coupled to the trailing arm and configured to dampen rotation of the trailing arm about the trailing arm axis within a normal operating range, and to limit the rotation of the trailing arm about the trailing arm axis to the normal operating range; and
  a fuse pin coupled to the shock absorber and configured to break when a load acting on the fuse pin exceeds a pre-determined threshold to remove the limit imposed on the trailing arm by the shock absorber.

* * * * *